United States Patent [19]

Furukawa

[11] 3,806,640

[45] Apr. 23, 1974

[54] VIDEO SIGNAL RECORDING AND REPRODUCING SYSTEM

[75] Inventor: Masamichi Furukawa, Kawasaki, Japan

[73] Assignee: Ricoh Co. Ltd., Tokyo, Japan

[22] Filed: July 31, 1972

[21] Appl. No.: 276,320

[30] Foreign Application Priority Data

July 31, 1971 Japan ............................... 46-57731
July 31, 1971 Japan ............................... 46-57732

[52] U.S. Cl. ........................ 178/6.6 A, 178/6.6 DD
[51] Int. Cl. ............................................ H04n 1/36
[58] Field of Search .................... 178/6.6 A, 6.6 DD

[56] References Cited

UNITED STATES PATENTS 2,824,904 2/1958 Toulon ............................ 178/6.6 A
3,082,293 3/1963 Johnson ........................ 178/6.6 DD
3,564,127 2/1971 Szikiai .......................... 178/6.6 DD

*Primary Examiner*—Terrell W. Fears
*Attorney, Agent, or Firm*—Cooper, Dunham, Clark, Griffin & Moran

[57] ABSTRACT

A system in which a video signal is converted into several narrower bandwidth signals, each of the several narrower bandwidth signals is magnetically recorded on an individual track, and the recorded signals are subsequently reproduced and combined to form the original video signal. The system dispenses with the need to use expensive rotary head video tape recorders, and allows video signals to be recorded on ordinary types of tape recorders, or other magnetic recorders.

8 Claims, 25 Drawing Figures

VIDEO SIGNAL RECORDING AND REPRODUCING SYSTEM

BACKGROUND OF THE INVENTION

The invention relates to a video signal recording and reproducing system.

When it is desired to record and subsequently reproduce wide bandwidth signals, such as video signals, the devices used for the purpose must have wide bandwidth and high recording density. Devices meeting these requirements exist, but their cost is high. For example, there are rotary head video tape recorders with sufficient bandwidth and sufficient recording density to handle video signals, but they are mechanically and electronically sophisticated devices and are expensive to manufacture and maintain. Ordinary tape recorders cannot be used for signals whose bandwidth is of the order of the video signal bandwidth, because a significant portion of the video signal recorded thereon would be irretrievably lost.

In television, horizontal resolution is generally expressed not in the number of picture elements which can be included in an effective scanning period, but in terms of the number of picture elements which can be included in a width equal to the height of the screen to facilitate comparison of horizontal resolution with vertical resolution. In the television broadcasting system used in Japan and the United States, the highest frequency of the frequency band of a video signal is set at 4,25 MHz, so that the highest horizontal resolution achievable is about 350 lines.

Television receiving sets provide an acceptable range with video signals having a frequency bandwidth of over 2 MHz. Hence, recording and reproducing apparatus capable of handling a signal of frequency band higher than 2 MHz should be used for recording video signals. An image reproduced from a video signal of a frequency of 2 MHz, would have for example, horizontal resolution of about 160 lines and vertical resolution of about 350 lines. Apparatus capable of handling a signal of 2 MHz frequency band should use rotary heads, and such apparatus is expensive.

If it is possible to reproduce an acceptable TV image by means of apparatus whose frequency band is below 1 MHz, then VTR's of the type which have fixed heads could be used, thereby substantially lowering the cost of video signal recording and reproducing.

An image reproduced from a 2 MHz video signal will have horizontal resolution of about 160 lines and a vertical resolution of about 350 lines. The vertical resolution commensurate with horizontal resolution of 160 lines should be about 160 lines. Vertical resolution of 350 lines is therefore not required.

SUMMARY OF THE INVENTION

In the invented system, a wide bandwidth video signal is converted into several narrower bandwidth signals, each of the several signals is magnetically recorded, and the recorded signals are subsequently reproduced and recombined to form the original wide bandwidth video signal. This allows the use of lower cost magnetic recording and reproducing apparatus, instead of the expensive rotary head video tape recorders normally required for recording and reproducing video signals.

In one particular embodiment, a video signal portion corresponding to one or more scan lines is divided into a plurality of signals of narrower bandwidth, each of the narrower bandwidth signals is written into a first set of memory circuits, the signals written into the memory circuits are read out at a lower rate than the write-in rate, and the signals read out of the memory circuits are magnetically recorded. Subsequently, the magnetically recorded signals are magnetically reproduced and are written into a second set of memory circuits. The signals written into the second set of memory circuits are then read out at a faster rate than the write-in rate, thereby allowing for recombining the lower bandwidth signals into the original video signal.

DETAILED DESCRIPTION

The purpose of the invented system is to allow a wide bandwidth signal, such as a video signal, to be recorded and reproduced by apparatus limited by narrower bandwidth. This is done by dividing the original wide bandwidth signal into several signals each of which has narrower bandwidth. However, when taken as a group, the several narrower bandwidth signals have the same information content as the original signal. The narrower bandwidth signals can be recorded and reproduced by narrower bandwidth magnetic recording apparatus, thus avoiding the need for devices such as expensive, rotary head video tape recorders.

Figure 1:
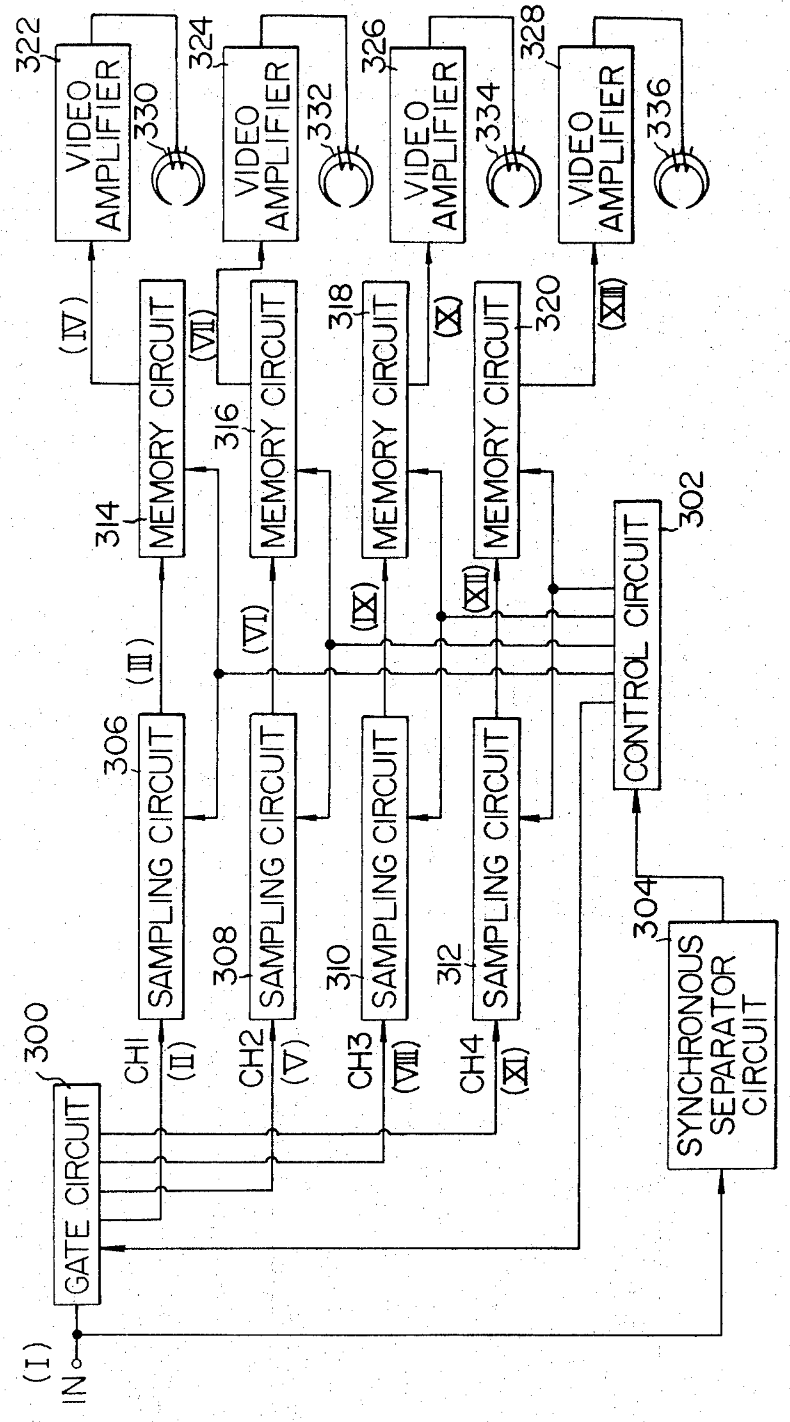
FIG. 1 is a block diagram showing one embodiment of a recording apparatus for use in the recording and reproducing system according to the present invention.

FIG. 1 shows one example of recording apparatus forming a part of the invented system. In the FIG. 1 embodiment, magnetic tape is used as recording medium. Prior to the recording, an input video signal is divided into four signals to be recorded in four channels, with the frequency of each recorded signal corresponding to one-third the original frequency of the video signal. The wave forms of output signals of various blocks of the apparatus are as shown at (I) to (XIII) in FIG. 2.

Figure 2:
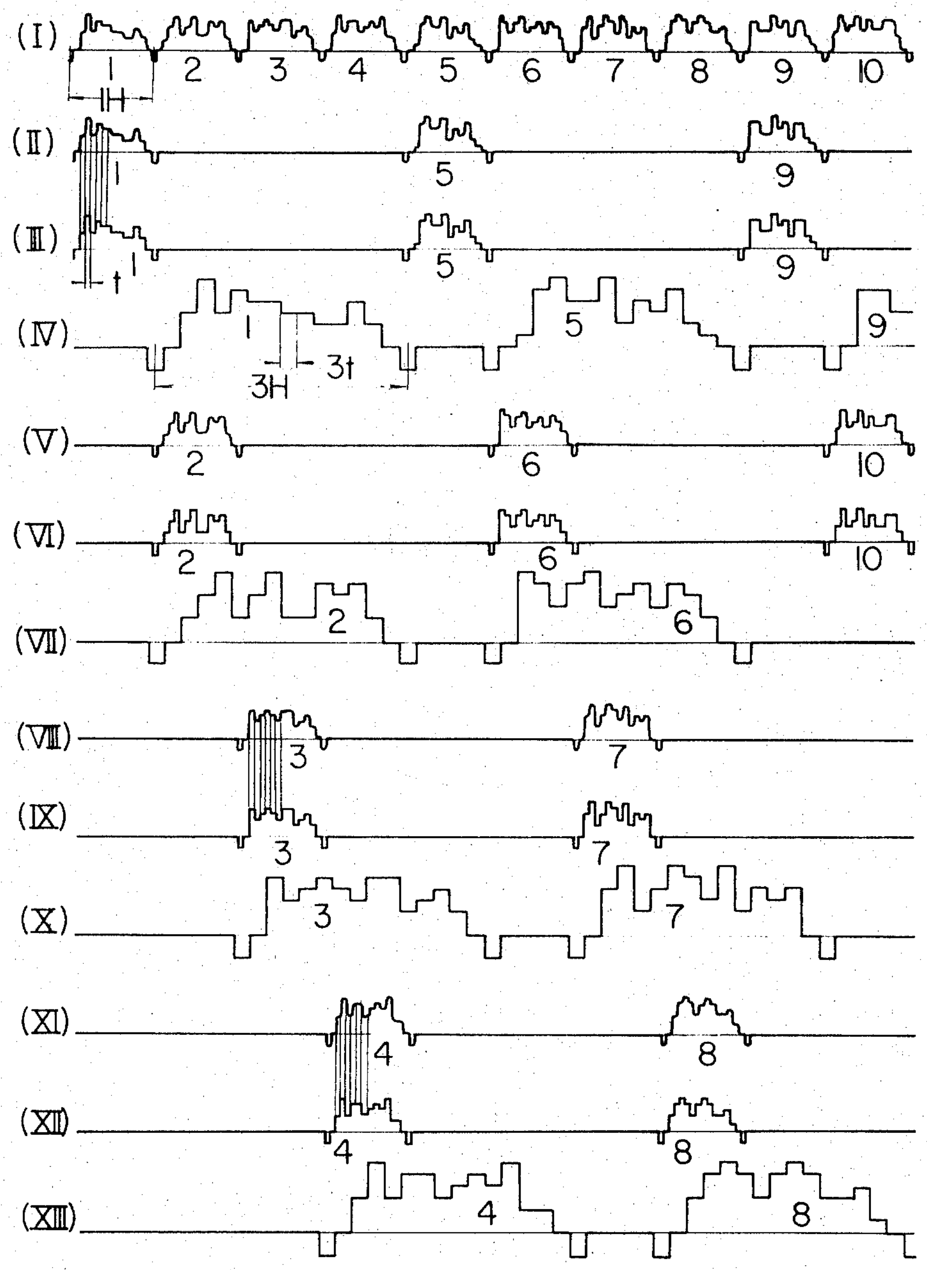
FIG. 2 shows the wave forms of the output signals of certain blocks of the apparatus shown in FIG. 1.

More specifically, a video signal of the wave form shown in FIG. 2 (I) is introduced into an input terminal IN shown in FIG. 1. The symbol $1^H$ shown in FIG. 2 (I) represents the scanning time (1 frame) for one horizontal scan line. The video signal introduced into the input terminal IN is successively distributed for each successive frame to channels CH1 to CH4 by a gate circuit 300. The signals distributed to the channels CH1 to CH4 have wave forms illustrated in FIG. 2 (II), (V), (VIII) and XI) respectively. The gate circuit 300 is operated by a control circuit 302 which is actuated by the horizontal synchronizing signals taken out of the input video signals by a synchronous separator circuit 304.

The signals distributed by the gate circuit 300 to the channels CH1 to CH4 are introduced into sampling circuits 306, 308, 310, 312 respectively, and are sampled thereby in a time *t*. The samples which have wave forms as shown in FIG. 2 (III), (VI), (IX) and (XII) are written in memory circuits 314, 316, 318 and 320 respectively.

Sampling and write-in take place simultaneously under the control of control circuit 302. As soon as the write-in of one horizontal scanning line is finished, the signals are read out in the same order as the write-in order in a time 3*t* before the next following line is written in. The wave forms are as shown in FIG. 2 (IV), (VII), (X) and (XIII), respectively. The signals stored in the memory circuits 314, 316, 318 and 320 are thus read out, and are amplified by video amplifiers 322, 324, 326 and 328, to be supplied to fixed recording heads 330, 332, 334 and 336 respectively. The signals thus amplified are separated into four channels by the respective heads and simultaneously recorded in four tracks on a magnetic tape (not shown).

The components of the video signal recorded on the four tracks on the magnetic tape have a frequency which is one third the frequency of the original video signal.

The memory circuits used in the apparatus described should be capable of transmitting the information contained in the input signal. Transmittance of a signal of a frequency up to 4 MHz requires memory circuits with a capacity of more than 450 words. Their sampling timing will be about 0.14$\mu$S.

Thus, the memory circuits suiting this condition are those which each consist of a conglomerate of capacitors or other elements capable of directly storing anologue quantities, or of the type which converts anologue quantities into digital quantities and stores the information in digital representation. The latter are those which each are a conglomerate of flip-flop circuits of different operation levels. The memory circuits which store information in digital representation should have their output signals converted into anologue representation again. Accordingly, when a conglomerate of flip-flop circuits is used, IC's or LSI's can be used advantageously.

Figure 3:
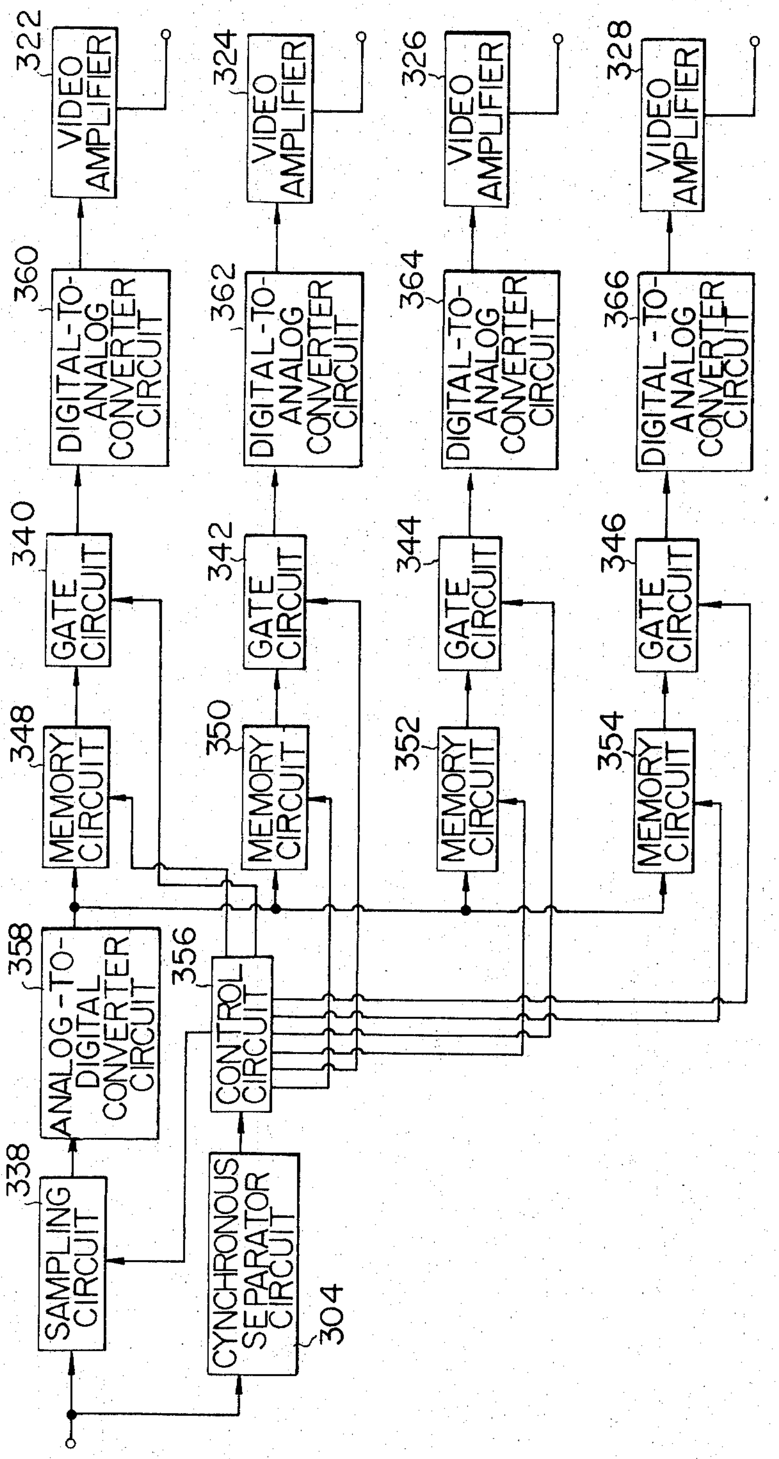
FIG. 3 is a block diagram representing a modification of the apparatus of FIG. 1.

A recording apparatus shown in FIG. 3 may be used in place of the recording apparatus shown in FIG. 1. In the apparatus shown in FIG. 3, the video signal introduced into the input terminal IN in FIG. 1 is introduced into a sampling circuit 338 which is shared by four channels. With this arrangement, signals read out from the memory circuits 348, 350, 352 and 354 are taken out by gate circuits 340, 342, 344 and 345 respectively which are controlled by a control circuit 356.

The memory circuits 348, 350, 352 and 354 are of the type which permit digital signals to be written and read out. There is provided an analogue-to-digital converter circuit 358 for converting outputs of the sampling circuit into digital signals for introduction into the memory circuits 348, 350, 352 and 354. There are also provided digital-to-analogue converter circuits 360, 362, 364 and 366 for converting outputs of the gate circuits 340, 342, 344 and 346 into analogue signals for introduction into the video amplifiers 322, 324, 326 and 328. The parts in FIG. 3 which are similar to those in FIG. 1 are indicated by like reference characters and their descriptions are omitted.

Figure 4A:
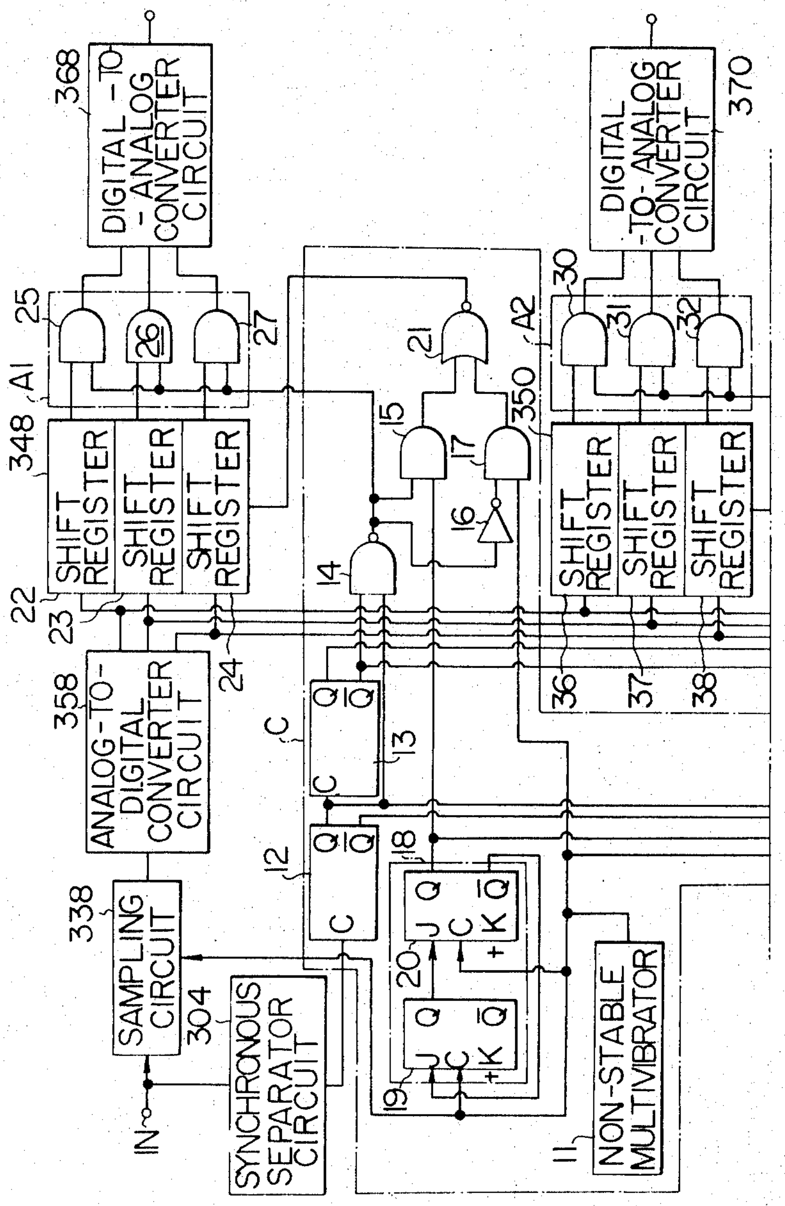
FIGS. 4*a* and 4*b* show in greater detail the apparatus shown in FIG. 3.
Figure 4B:
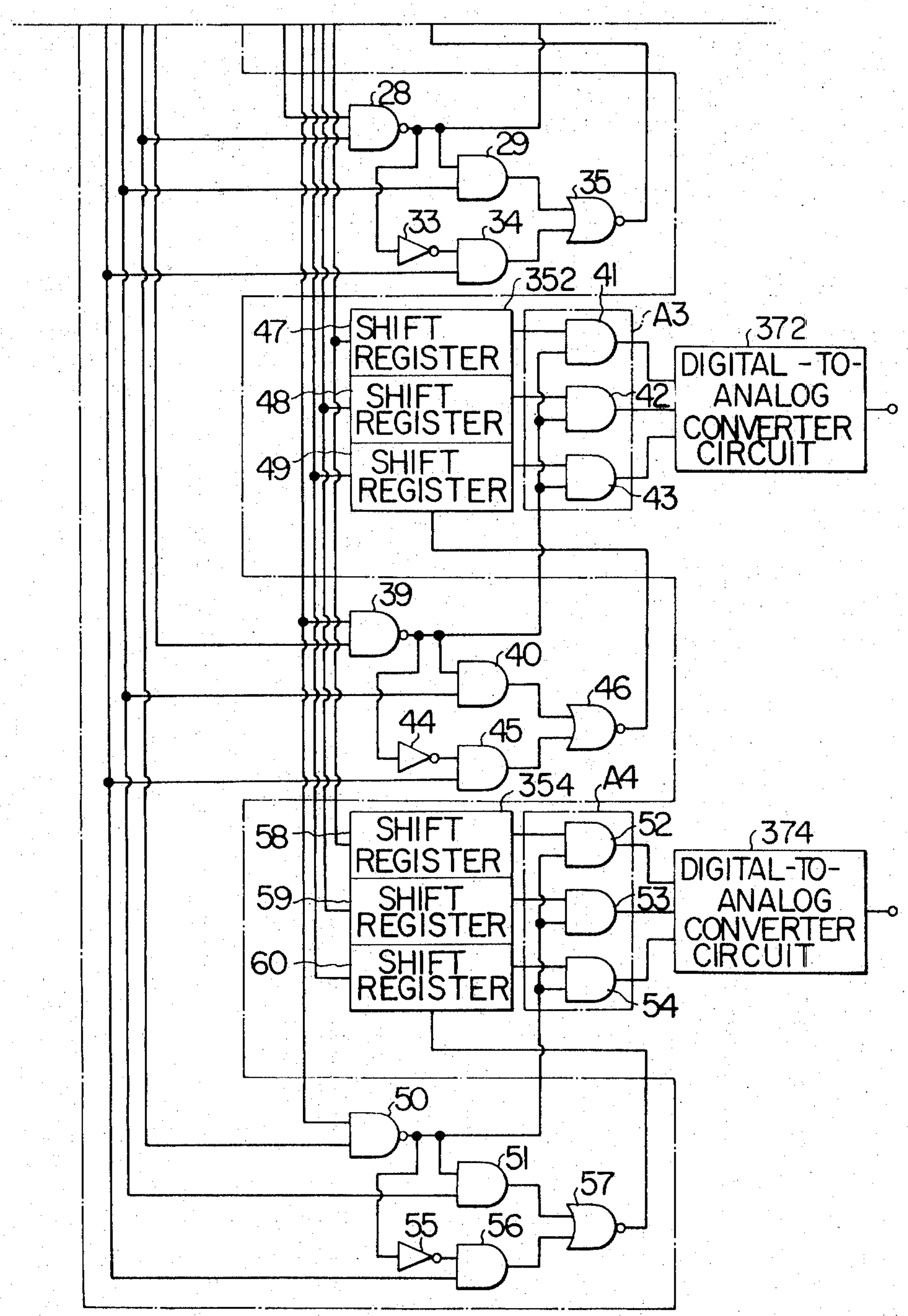

FIG. 4 shows in greater detail the recording apparatus shown in FIG. 3. As shown, a video signal of the wave form shown in FIG. 5 (I) is introduced into the input terminal IN and supplied to the sampling circuit 338 where it is sampled by a sampling signal supplied from a multivibrator 11. The output signal of the sampling circuit 338 is converted into digital signals by analogue-to-digital converter circuit 358 and stored in the memory circuits 348, 350, 352 and 354.

Figure 5:
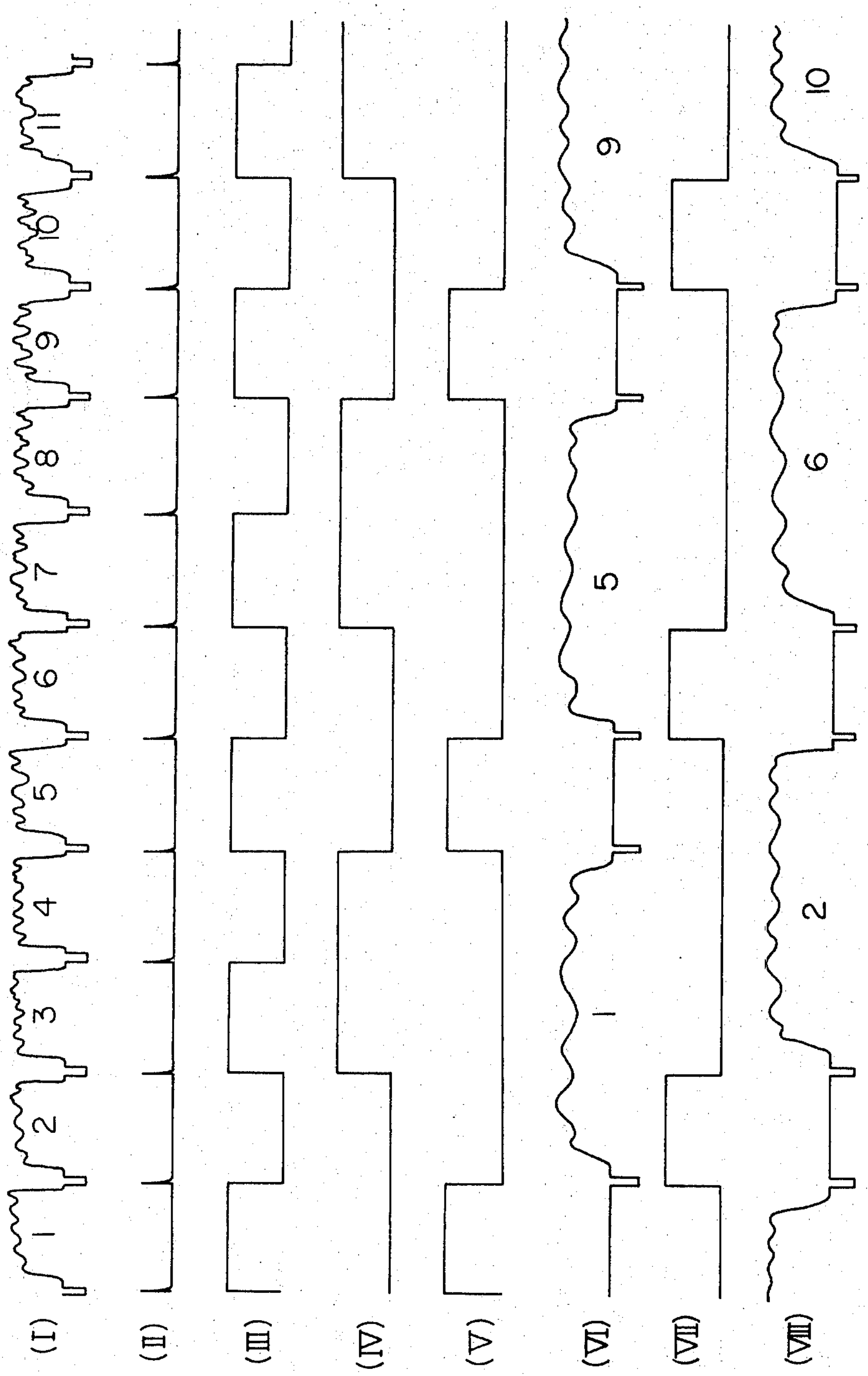
FIG. 5 shows the wave forms of the output signals of certain blocks of the apparatus shown in FIG. 4.

The video signal introduced into the input terminal IN is also supplied to the synchronous separator circuit 304 where the horizontal synchronizing signals are separated from the video signal to produce a signal of the wave form shown in FIG. 5 (II). The output of the synchronous separator circuit 304 is introduced into an input terminal *c* of a flip-flop 12 which reverses its state of operation each time a signal is supplied from the synchronous separator citcuit 304 to produce at an output terminal Q thereof an output signal which is of the wave form shown in FIG. 5 (III). At the same time, an output signal opposite in phase to the output signal produced in the output terminal Q is produced at an output terminal Q' thereof.

The output produced at the output terminal Q of flip-flop 12 is introduced into an input terminal *c* of flip-flop 13 which reverses its state of operation each time a signal is supplied from flip-flop 12 to produce at an output terminal Q thereof an output signal which is of the wave form shown in FIG. 5 (IV). At the same time, an output signal opposite in phase to the output signal produced in the output terminal Q is produced at an output terminal Q′ thereof.

The output signals produced at the output terminal Q of flip-flop 12 and the output terminal Q′ of flip-flop 13 are supplied to a NAND circuit 14 whose output is supplied to an inverter 16 where the signal is inverted into a signal as shown in FIG. 5 (V). The output signal produced by the NAND circuit 14 is in the form of a rectangular pulse wave which is in a state of "1" for a time interval corresponding to the horizontal periods, with one horizontal period covering the period from the time one horizontal synchronizing signal is produced to the time the next following horizontal synchronizing signal is produced, and with the pulses being produced at one horizontal period interval. This rectangular pulse is simultaneously supplied to an AND circuit 15 and, through the inverter 16, and an AND circuit 17.

The output signal of multi-vibrator 11 is also supplied to a counter 18 which consists of flip-flops 19 and 20. The signal from multivibrator 11 is supplied to input terminals *c* of flip-flops 19 and 20. The output signal from a normal output terminal Q of flip-flop 19 is supplied to an input terminal J of flip-flop 20 while the output signal from a reverse output terminal Q′ of flip-flop 20 is supplied to an input terminal J of flip-flop 19. Input terminals K of flip-flops 19 and 20 are connected to a positive power source.

Flip-flops 19 and 20 are such that if a pulse is supplied to the input terminals *c* when the inputs to the input terminals J and K are in the state "1", then their state is reversed at the time the pulse decays. If a pulse is supplied to the input terminals *c* when the inputs to the input terminals J and K are "0", then an output representing "1" is produced at the output terminals Q at the time the pulse decays. If a pulse is supplied to the input terminals *c* when the input to the input terminals J and K are "0", then an output representing "0" is produced at the output terminals Q at the time the pulse decays. Thus, a pulse of a frequency which is one third the frequency of the pulse produced by multivibrator 11 is produced at the output terminal Q of the counter 18.

The output signal of multivibrator 11 is supplied to the AND circuit 17 while the output of counter 18 is supplied to the AND circuit 15. Thus, the output signal of multivibrator 11 is taken out in a time interval corresponding to one horizontal period through AND circuit 17, and then the output signal of counter 18 is taken out in a time interval corresponding to three horizontal periods through AND circuit 15. This operation is repeated.

The signals from AND circuits 17 and 15 are supplied to memory circuit 348 through a NOR circuit 21. The memory circuit 348 comprises shift registers 22 to 24 which correspond in number to the bit outputs of the analogue-to-digital converter circuit 358. The signal from the NOR circuit 21 is supplied to the memory circuit as shift pulses. Thus, the bit outputs of the analogue-to-digital converter circuit 358 are written in the shift registers 22 to 24 in synchronism with the shift pulses supplied from the NOR circuit 21, so that the information stored is shifted and read out.

The output signals of shift registers 22 to 24 are supplied to AND circuits 25 to 27 respectively, to which is also supplied the output signal of NAND circuit 14. Thus, the output signals of the analogue-to-digital converter circuit 358 are written in the shift registers 22 to 24 by the shift pulses which are the outputs of the multivibrator 11; the signals stored in the shift registers 22 to 24 are read out of the shift registers at a speed which is one third the speed at which the signals have been written; and unnecessary portions of output signals are removed by the AND circuits 25 to 27.

The signals from the AND circuits 25 to 27 are converted into an analogue signal of the wave form shown in FIG. 5 (VI) by a digital-to-analogue converter circuit 368. The analog signal is amplified by a video amplifier 322 (FIG. 3) and supplied to magnetic head 330 as a video signal to be recorded in a first track on a magnetic tape.

The signals from the output terminal Q′ of flip-flop 12 and the output terminal Q′ of flip-flop 13 are supplied to a NAND circuit 28, inverted at an inverter 33, and a signal of the wave form shown in FIG. 5 (VII) is produced. This signal is delayed by one horizontal period as compared with the output signal of NAND circuit 14. The output of NAND circuit 28 is supplied to AND circuits 29 to 32 and at the same time through the inverter 33 to an AND circuit 34. The output signal of counter 18 is supplied to AND circuit 29 while the output signal of multivibrator 11 is supplied to AND circuit 34. The output signals of AND circuits 29 and 34 are supplied as shift pulses through a NOR circuit 35 to shift registers 36 to 38 which constitute the memory circuit 350.

The bit outputs of analogue-to-digital converter circuit 358 are written in shift registers 36 to 38, shifted and read out to be transmitted to AND circuits 30 to 32 whose outputs are converted into an analogue signal by a digital-to-analogue converter circuit 370, i.e. into a video signal of the wave form shown in FIG. 5 (VIII). This video signal, which is one horizontal period immediately following the video signal from the digital-to-analogue converter circuit 370, is amplified by video amplifier 324 (FIG. 3) and recorded by a magnetic head 322 on a second track of the magnetic tape.

The signals from the output terminal Q of flip-flop 12 and the output terminal Q of flip-flop 13 are supplied to a NAND circuit 34 whose output signal is delayed by one horizontal period as compared with the output signal of NAND circuit 28. The output signal of NAND circuit 39 is supplied to AND circuits 40 to 43 and at the same time to an AND circuit 45 through an inverter 44. The output signal of counter 18 is supplied to AND circuit 40 while the output signal of multivibrator 11 is supplied to AND circuit 45. The output signals of AND circuits 40 and 45 are supplied as shift pulses through a NOR circuit 46 to shift registers 47 to 49 which constitute the memory circuit 352.

The bit outputs of analogue-to-digital converter circuit 351 are written in shift registers 47 to 49, shifted, and read out to be supplied to AND circuits 41 to 43 whose output signals are converted into an analogue signal by a digital-to-analogue converter circuit 372. The video signal from digital-to-analogue converter circuit 372 is one horizontal period immediately following the video signal from digital-to-analogue converter circuit 370, and it is emplified by a video amplifier 326

(FIG. 2) and recorded by a magnetic head 334 (FIG. 1) on a third track on the magnetic tape.

The signals from the output terminal Q' of flip-flop 12 and the output terminal Q of flip-flop 13 are supplied to a NAND circuit 50 whose output signal is a signal delayed by one horizontal period as compared with the output signal of NAND circuit 39. The output signal of NAND circuit 50 is supplied to AND circuits 51 to 54 and at the same time through an inverter 55 to an AND circuit 56. The output signal of counter 18 is supplied to AND circuit 51 while the output signal of multivibrator 11 is supplied to AND circuit 56. The output signals of AND circuits 51 and 56 are supplied as shift pulses through a NOR circuit 57 to shift registers 58 to 56 which constitute the memory circuit 354. The bit outputs of analogue-to-digital converter circuit 351 are written in shift registers 58 to 60, shifted, and read out to be supplied to AND circuits 52 to 54. The output signals of AND circuits 52 to 54 are converted into an analogue signal by a digital-to-analogue converter circuit 374. The video signal from digital-to-analogue converter circuit 374 is one horizontal period immediately following the video signal from digital-to-analogue converter circuit 372, and it is amplified by a video amplifier 328 (FIG. 3) and recorded by a magnetic head 336 (FIG. 1) on a fourth track on the magnetic tape.

The AND circuits 25 to 27, 30 to 32, 41 to 43 and 52 to 54 constitute the gate circuits 340, 342, 344 and 346 respectively, and the multivibrator 11, flip-flops 12, 13, counter 18, NAND circuits 28, 39 and 40, AND circuits 15, 17, 29, 34, 40, 45, 51 and 56, inverters 16, 33 and 55, and NOR circuits 21, 25, 46 and 57 constitute the control circuit 356.

In the embodiment of the invention described above, the time interval required to read-out a video signal from the memory circuits 348, 350, 352 and 354 is three times as great as the time interval required for write-in, so that the frequency components of the video signal are reduced to one-third, i.e. the video signal bandwidth is reduced to one-third the original value. Accordingly, the frequency is lowered and this permits the use of inexpensive recording and reproducing apparatus.

Figure 6:
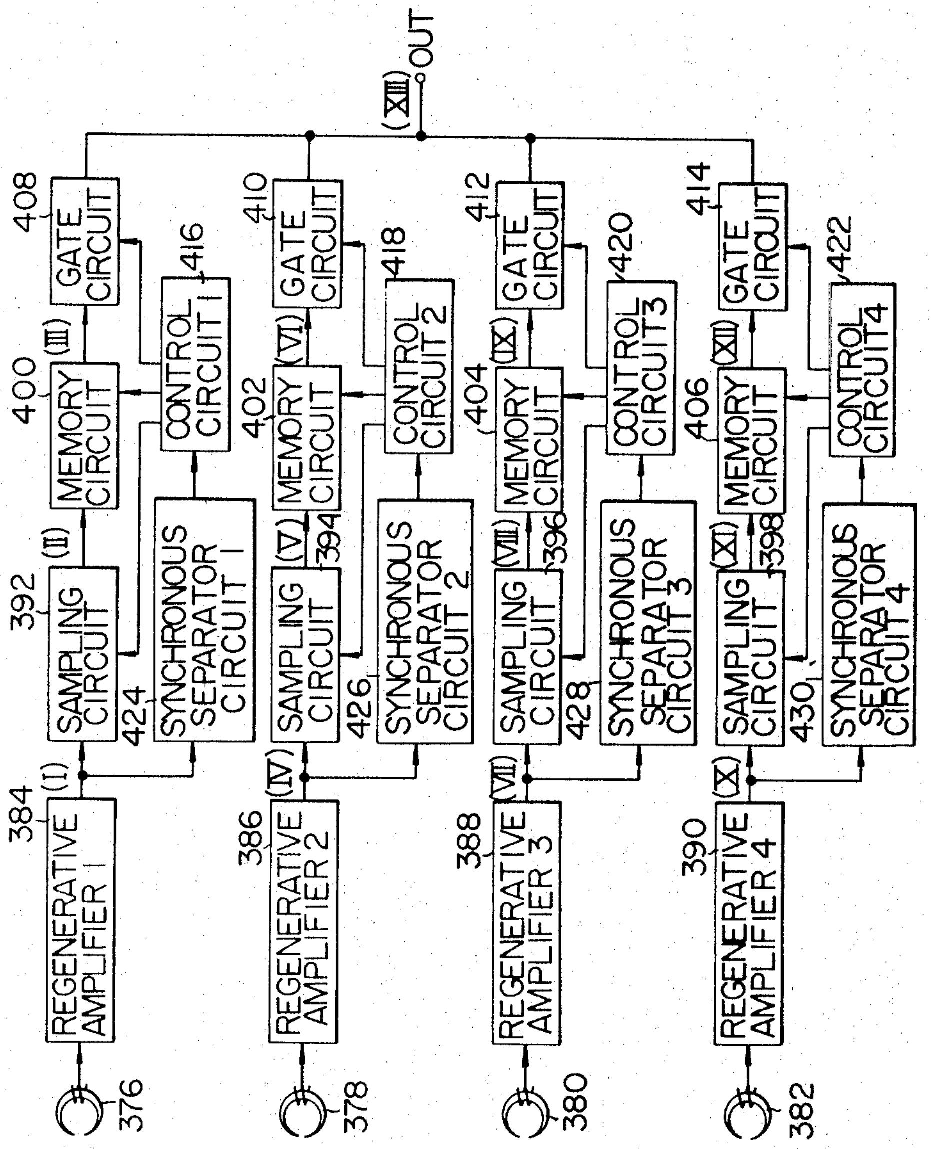
FIG. 6 is a block diagram showing one embodiment of a reproducing apparatus for use in the recording and reproducing apparatus according to the invention to reproduce signals originally recorded by the apparatus shown in FIG. 1.
Figure 7:
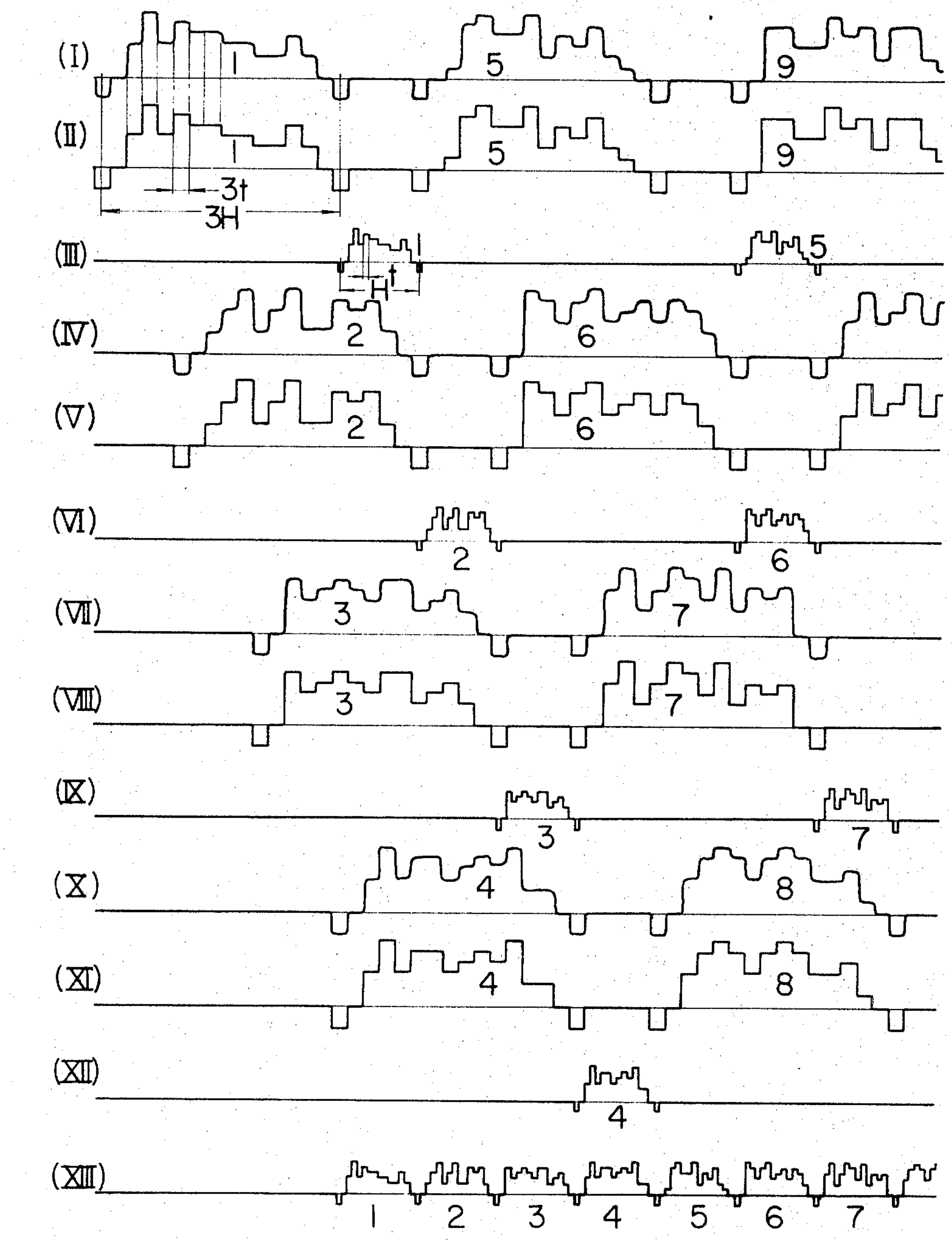
FIG. 7 shows the wave forms of the output signals of certain blocks of the apparatus shown in FIG. 6.

FIG. 6 shows an example of the apparatus used for reproducing the signals recorded on the magnetic tape as aforementioned. The wave forms of the output signals of various blocks of the apparatus are shown in FIG. 7 (I) to (XIII). The signals recorded on four tracks on the magnetic tape are taken out by reproducing heads 376, 378, 380 and 382 and amplified by regenerative amplifiers 384, 386, 388 and 390 respectively. The outputs of the amplifiers have the wave forms shown in FIG. 7 (I), (IV), (VII) and (X) respectively, and are supplied to sampling circuits 392, 394, 396 and 398 respectively before being stored. The signals supplied to the last mentioned sampling circuits are sampled in a time 3*t* (FIG. 7). The sampled signals have wave forms shown in FIG. 7 (II), (V), (VIII) and XI) respectively, and are stored in the memory circuits 400, 402, 404 and 406 respectively.

When signals corresponding to one frame are written in the memory circuits 400, 402, 404 and 406, they are read out during the next IN time in a read-out period *t* (FIG. 7). The read-out signals have wave forms shown in FIG. 7 (III), (VI), (IX) and (XII). The signals of these wave forms are added together by gate circuits 408, 410, 412 and 414 into a continuous signal wave shown in FIG. 7 (XIII) which is taken out through an output terminal OUT.

The sampling circuits 392, 394, 396 and 398, memory circuits 400, 402, 404 and 406 and gate circuits 408, 410, 412 and 414 are controlled by control circuits 416, 418, 420 and 422 respectively which separate horizontal synchronizing signals from the signals reproduced from various channels by synchronous separator circuits 424, 426, 428 and 430 and which are actuated by the separated horizontal synchronizing signals.

Figure 8:
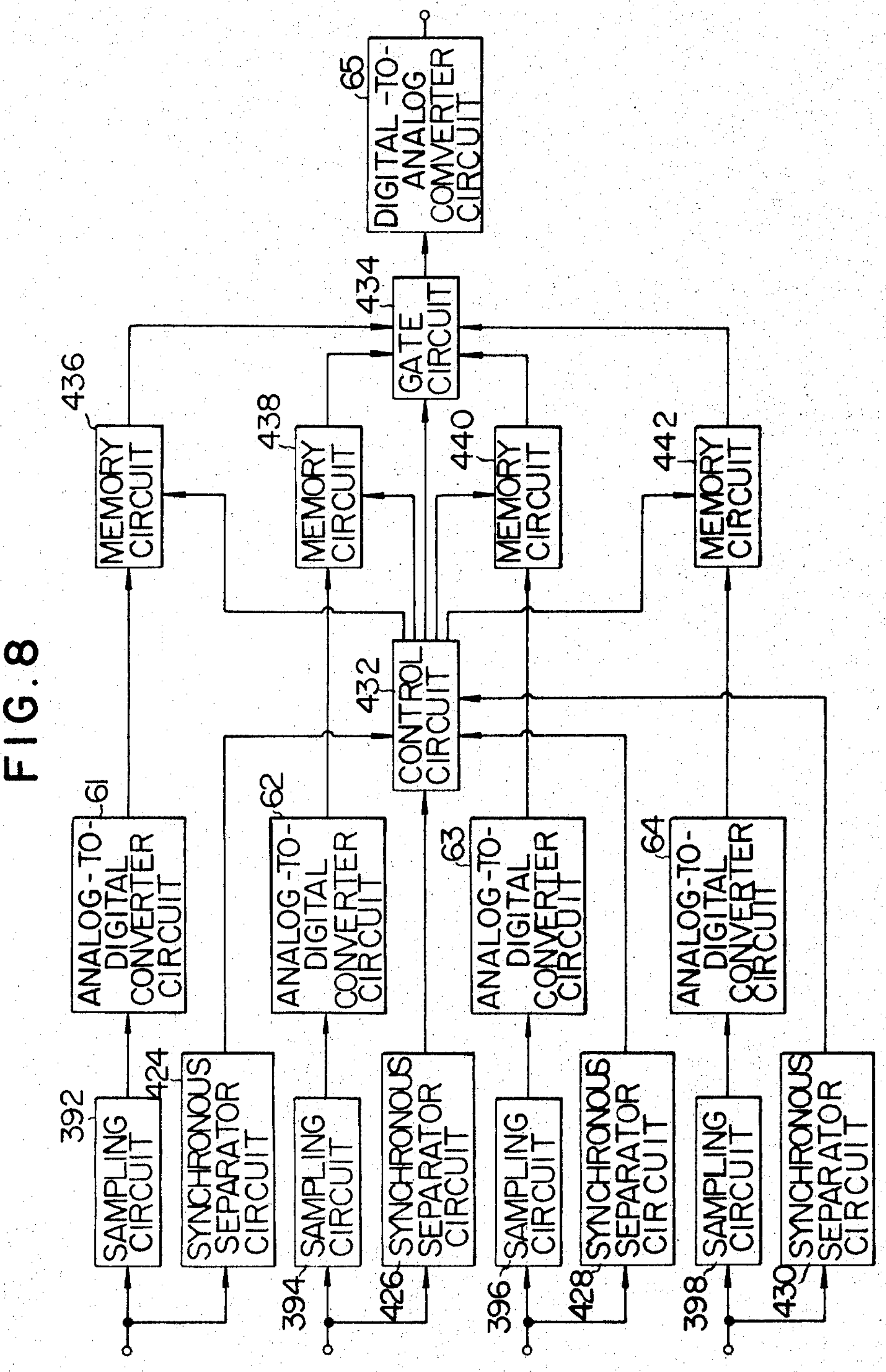
FIG. 8 is a block diagram representing a modification of the apparatus shown in FIG. 6.

The aforementioned apparatus shown in FIG. 6 can be replaced by the apparatus shown in FIG. 8. The apparatus shown in FIG. 8 is distinguished from the apparatus shown in FIG. 6 in that one control circuit 432 is used in place of the control circuits 416, 418, 420 and 422, one gate circuit 434 is used in place of gate circuits 408, 410, 412 and 414, the memory circuits 436, 438, 440 and 442 are of the type which digital signals are written in, and out of which digital signals are read, and there are provided analogue-to-digital converter circuits 61 to 64 for converting the output signals of sampling circuits 392, 394, 396 and 398 into digital signals to be stored in the memory circuits 436, 438, 440 and 442, and a digital-to-analogue converter circuit 65 for converting the output signal of gate circuit 434 into an analogue signal. Explanation of those parts of the apparatus shown in FIG. 8 which are similar to the parts described with reference to the apparatus shown in FIG. 6 is omitted.

One example of a specific embodiment of the apparatus shown in FIG. 8 is shown in FIGS. **9*a* and 9*b*. More specifically, the signals recorded in the first to fourth tracks on the magnetic tape are taken out by the magnetic heads 376, 378, 380 and 382 (FIG. 6), amplified by regeneration amplifiers 384, 386, 388 and 390, and supplied to the sampling circuits 392, 394, 396 and 398 (FIGS. 9*a* and 9*b*) and synchronous separator circuits 424, 426, 428 and 430 respectively. The outputs of regenerative amplifiers 384, 386, 388 and 390 have the wave forms shown in FIGS. 10*a* and 10*b* (I) to (IV) respectively. Pulses of a predetermined frequency are supplied from a multivibrator 66 to a counter 67 which produces pulses of a frequency which is one-third that of the pulses produced by multivibrator 66. The pulses from counter 67 are supplied as sampling pulses to the sampling circuits 392, 394, 396 and 398 where the signals from the regenerative amplifiers 384, 386, 388 and 390 are sampled. The output signals of sampling circuits 392, 394, 396 and 398 are converted into digital signals by the analogue-to-digital converter circuits 61 to 64 and supplied to the memory circuits 436, 438, 440 and 442** respectively.

The signals from the regenerative amplifiers 384, 386, 388 and 390 are supplied to the synchronous separator circuits 424, 426, 428 and 430 to separate horizontal synchronizing signals, so that signals of the wave forms shown in FIGS. **10*a* and 10*b* (V) to (VIII) are produced. The signal of synchronous separator circuit 424 is supplied to AND circuits 68 to 71; the signal of synchronous separator circuit 426 is supplied to AND circuits 69, 70, 72 and 73; the output signal of synchronous separator circuit 428 is supplied to AND circuits 72 to 75; and the output signal of synchronous separator circuit 430 is supplied to AND circuits 68, 71, 74 and 75. Thus, the output signal of AND circuit 68 is produced every fourth horizontal period as shown in FIGS. 10***a* and 10*b* (IX) and supplied to a setting input terminal S of a flip-flop 76 to set the same, and the output signal of AND circuit 69 is produced with a time lag of one horizontal period as compared with the output signal of AND circuit 68 as shown in FIGS. 10*a* and 10 *b* (X) and supplied to a resetting input terminal R of flip-flop 76 to reset the same.

Figure 10A:
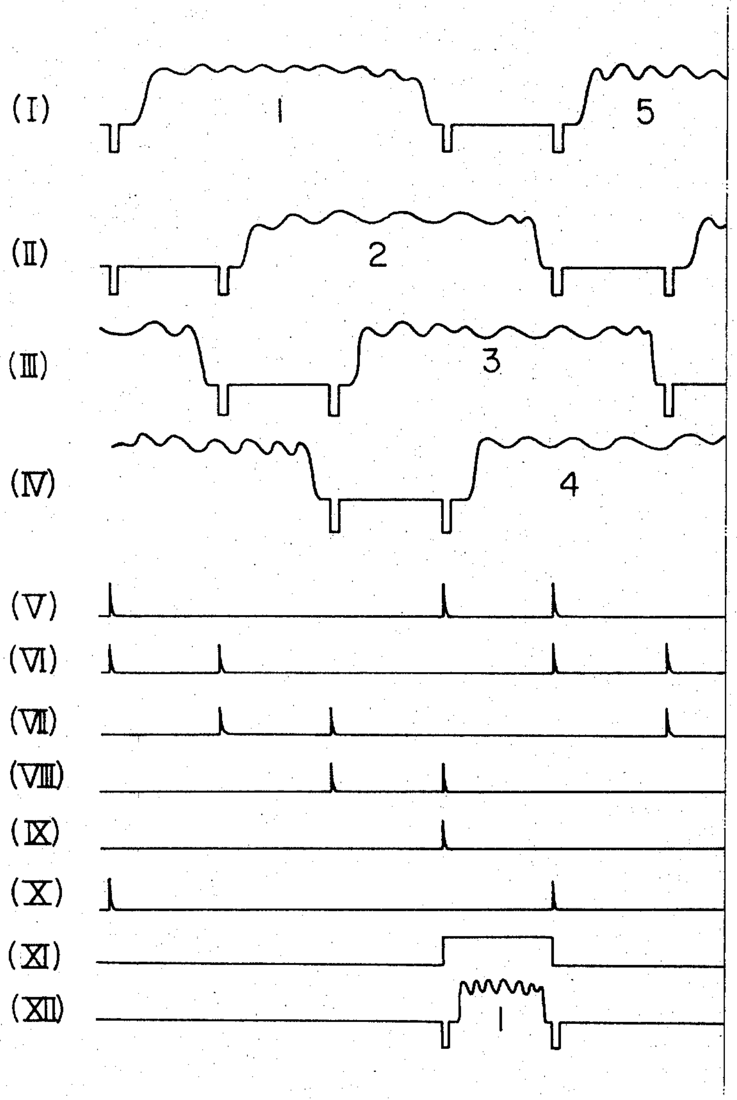
FIGS. 10*a* and 10*b* show the wave forms of the outputs of certain blocks of the apparatus shown in FIG. 9.
Figure 10B:
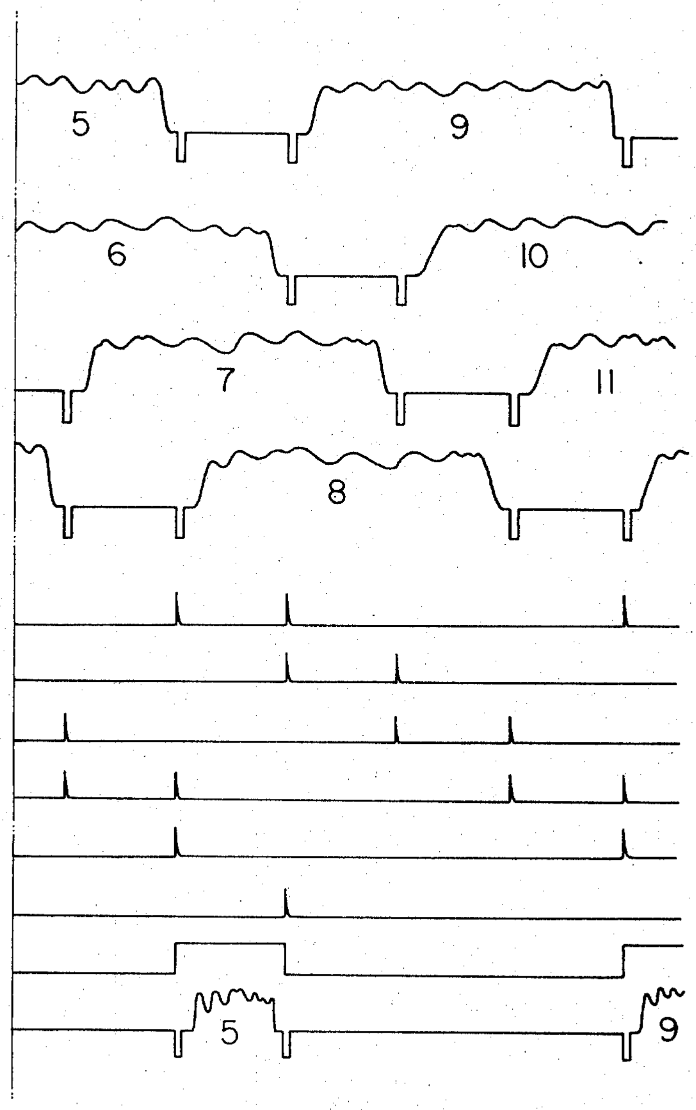

Thus, flip-flop 76 produces at a normal output terminal Q thereof a signal which has a time interval of one horizontal period and which is produced at intervals of three horizontal periods as shown in FIGS. 10*a* and 10*b* (XI), and at the same time at a reverse output terminal Q' thereof a signal which is reversed in phase with respect to the signal produced at the normal output terminal Q.

The signal produced at the normal output terminal Q of flip-flop 76 is supplied to an AND circuit 77 together with the output signal of multivibrator 66, and the signal produced at the reverse output terminal Q' of flip-flop 76 is supplied to an AND circuit 78 together with the output signal of counter 67. The output signals of AND circuits 77 and 78 are supplied through a NOR circuit 79 as shift pulses to shift registers 80 to 82 which constitute the memory circuit 436. Bit outputs of analogue-to-digital converter circuit 61 are written in shift registers 80 to 82, shifted, and read out by these shift pulses to be supplied to AND circuits 83 to 85.

The signal produced at the normal output terminal Q of flip-flop 7 is supplied to AND circuits 83 to 85. Thus, AND circuits 83 to 85 produce signals which are written in shift registers 80 to 82 by shift pulses from counter 67 during three horizontal periods and which are read out of the shift registers by shift pulses from multivibrator 66 during one horizontal period, or at a speed which is one-third the write-in speed. The output signals of AND circuits 80 to 82 are passed through NOR circuits 86 to 88 and converted into an analogue signal by digital-to-analogue converter 65 and taken out as a video signal having the wave form shown in FIGS. 10*a* and 10*b* (XII).

The output signal of AND circuit 70 becomes the same as the output signal of AND circuit 69 and is supplied to a setting input terminal S of a flip-flop 89 to set the same. The output signal of AND circuit 72 becomes a signal having a time lag of one horizontal period as compared with the output signal of AND circuit 70, and is supplied to a resetting input terminal R of flip-flop 89 to reset the same. The output signal of flip-flop 89 produced at a normal output terminal Q thereof and the output signal of multivibrator 66 are supplied to an AND circuit 90, and the output signal of flip-flop 89 produced at a reverse output terminal Q' thereof and the output signal of counter 67 are supplied to an AND circuit 91. The output signals of AND circuits 90 and 91 are passed through a NOR circuit 92 and supplied as shift pulses to shift registers 93 to 95 which constitute the memory circuit 438.

The bit outputs of analogue-to-digital converter circuit 62 are written in shift registers 93 to 95, shifted, and read out by the shift pulses to be supplied to AND circuits 96 to 98 to which the signal from the normal output terminal Q of flip-flop 89 is also supplied. The output signals of AND circuits 96 to 98 are passed through NOR circuits 86 to 88 and converted into an analogue signal by digital-to-analogue converter circuit 65. This analogue signal is a video signal which immediately follows the video signal from AND circuits 83 to 85.

The output signal of AND circuit 73 becomes the same as the output signal of AND circuit 72 and is supplied to a setting input terminal S of a flip-flop 99 to set the same. The output signal of AND circuit 74 becomes a signal having a time lag of one horizontal period as compared with the output signal of AND circuit 73 and is supplied to a resetting input terminal R of flip-flop 99 to reset the same. The output signal of flip-flop 99 produced at a normal output terminal Q thereof and the output signal of multivibrator 66 are supplied to an AND circuit 100, and the output signal of flip-flop 99 produced at a reverse output terminal Q' thereof and the output signal of counter 67 are supplied to an AND circuit 101.

The output signals of AND circuits 100 and 101 are passed through a NOR circuit 102 and supplied as shift pulses to shift registers 103 to 105 which constitute the memory circuit 440. The bit outputs of analogue-to-digital converter circuit 63 are written in the shift registers 103 to 105, shifted, and read out by the shift pulses to be supplied to AND circuits 106 to 108 to which the output signal of flip-flop 99 produced at its normal output terminal Q is also supplied. Thus, the output signals of AND circuits 106 to 108 are passed through NOR circuits 86 to 88 and converted by digital-to-analogue converter circuit 65 into an analogue signal which is a video signal immediately following the video signal from AND circuits 96 and 98.

The output signal of AND circuit 75 becomes the same as the output signal of AND circuit 74 and is supplied to a setting input terminal S of a flip-flop 109 to set the same. The output signal of AND circuit 71 becomes a signal having a time lag of one horizontal period as compared with the output signal of AND circuit 75 and is supplied to a resetting input terminal R of flip-flop 109 to reset the same. The output signal of flip-flop 109 produced at a normal output terminal Q thereof and the output signal of non-stable multivibrator 66 are supplied to an AND circuit 110, and the output signal of flip-flop 109 produced at a reverse output terminal Q' thereof and the output signal of counter 67 are supplied to an AND circuit 111.

The output signals of AND circuits 110 and 111 are passed through a NOR circuit 112 and supplied as shift pulses to shift registers 113 to 115 which constitute the memory circuit 442. The bit outputs of analogue-to-digital converter circuit 64 are written in the shift registers 113 to 115, shifted, and read out by the shift pulses to be supplied to AND circuits 116 to 118 to which the output signal of flip-flop 109 produced at a normal output terminal Q thereof is also supplied. The output signals of AND circuits 116 to 118 are passed through NOR circuits 86 to 88 and converted by digital-to-analogue converter circuit 65 into an analogue signal which is a video signal immediately following the video signal from AND circuits 106 to 108.

Thus, the output signal of digital-to-analogue converter circuit 65 is similar to the video signal supplied to the input terminal IN.

Figure 9A:
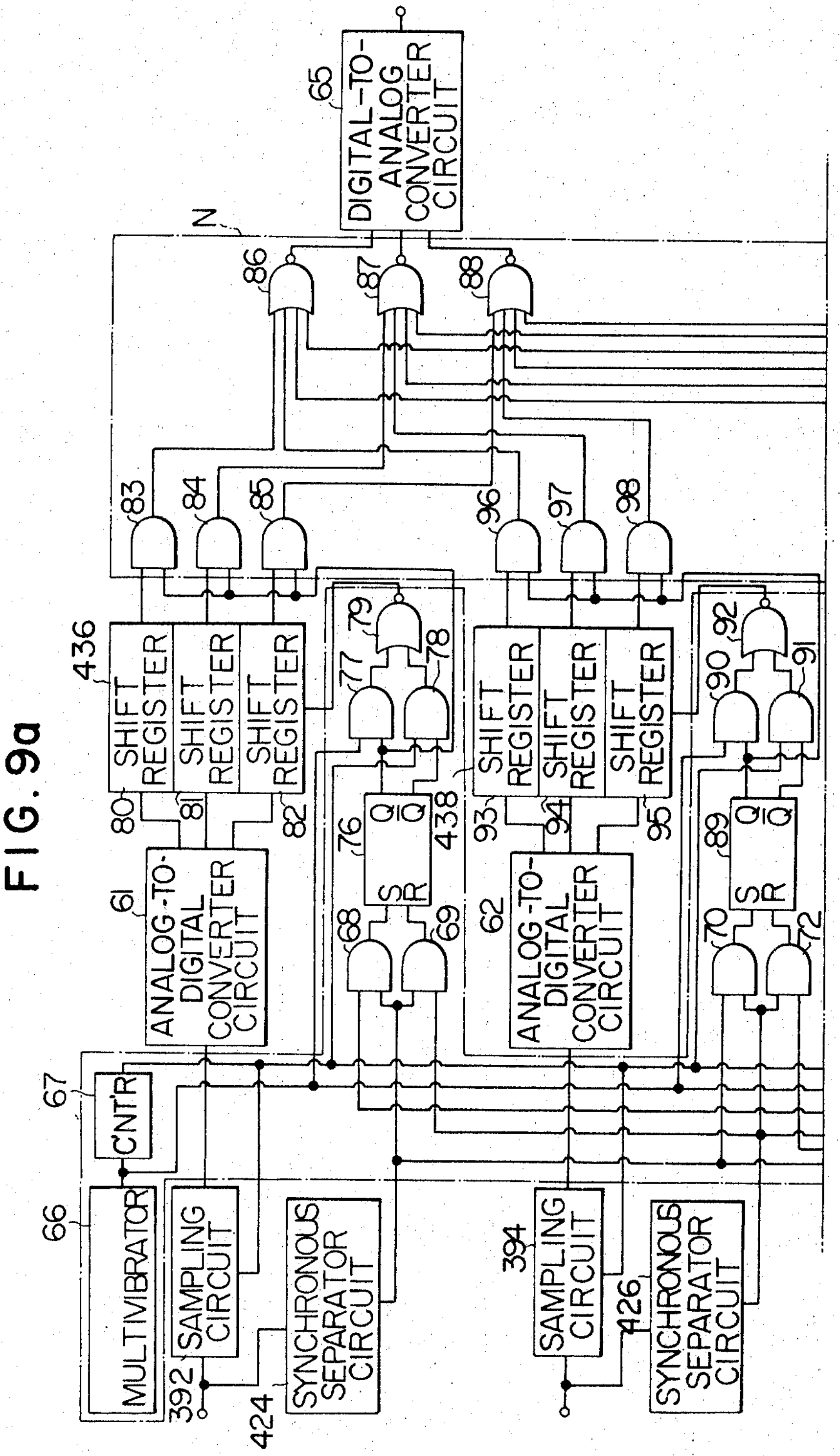
FIGS. 9*a* and 9*b* illustrate in greater detail the apparatus shown in FIG. 8.
Figure 9B:
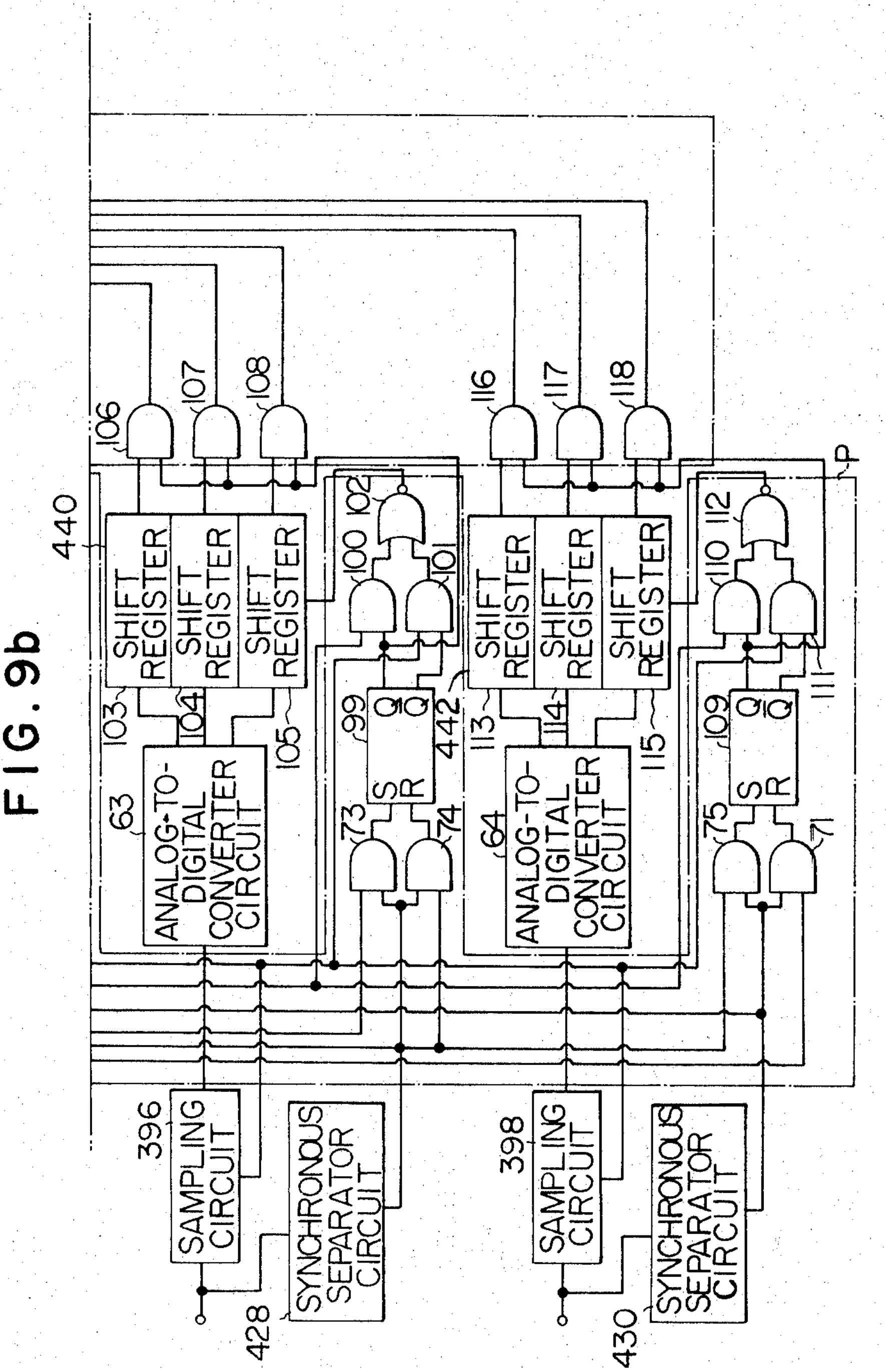

The AND circuits 83 to 85, 96 to 98, 106 to 108 and 116 to 118 and NOR circuits 86 to 88 of FIGS. 9*a* and 9*b* constitute the gate circuit 434 of FIG. 8; and the multivibrator 66, flip-flops 67, 76, 89, 99 and 108, AND circuits 68 to 75, 77, 78, 90, 91, 100, 101, 110 and 111, and NOR circuits 79, 92, 102 and 112 of FIGS. 9a and 9b constitute the control circuit 432 of FIG. 8.

From the foregoing, it will be appreciated that the aforesaid embodiments permit a video signal comprising high frequency components to be converted into signals of lower frequency for recording, and then permit such signals to be reconverted into a video signal of the original frequency. This makes it possible to use inexpensive apparatus for recording and reproducing a video signal and to carry out the operation readily by a simple mechanism. Thus, the invented system is advantageous because it permits the frequency bandwidth of signals to be narrowed without reducing the quality of the picture produced by such signals on a television screen.

The embodiments shown and described have been concerned with using four sets of memory circuits for dividing an input signal into four signals on four channels and for reducing the frequency by one-thifd. It is to be understood that the invention is not limited to the aforementioned number of memory circuits and to the number into which the input signal is divided, and that any other suitable combinations can be selected for this purpose.

Another embodiment of the invention is now described. This embodiment is directed to producing with a 1 MHz signal a picture on a television screen which is substantially of the same quality as a picture produced with a 2 MHz signal. This is done by bringing vertical resolution to a level similar to that of horizontal resolution in accord with the aspect ratio.

Figure 11:
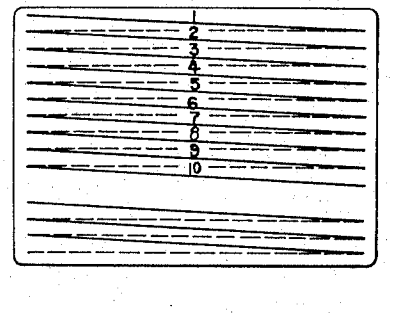
FIG. 11 (PRIOR ART)
FIG. 11 shows the prior art manner in which horizontal scanning is effected on a television screen.

FIG. 11 shows the manner in which prior art horizontal scanning is effected. The numerals 1 to 10 designate the order of the horizontal scanning lines. Each line represents a picture element so that 525 scanning lines make up a complete picture. Now, if horizontal scanning were carried out such that the same signal occurs twice for 2 scanning lines, although the total number of horizontal scanning lines remains unchanged as shown in FIG. 12, the vertical resolution of the picture would be reduced by half, but its horizontal resolution would be similar to that shown in FIG. 11.

Figure 12:
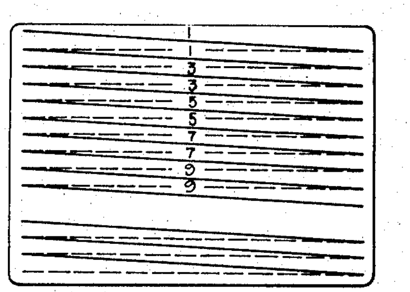
FIG. 12 shows the manner in which horizontal scanning is effected on a television screen according to the present invention.

In this embodiment, the frequency of a video signal is reduced by half by using repeat time and the video signal is recorded in a recording apparatus in this state, and the signal having an increased time interval is restored to its original time interval and taken out twice repeatedly in playback, so as to produce the picture shown in FIG. 12.

The embodiment is now described in detail in connection with FIG. 13 which shows recording apparatus. The wave forms of outputs of certain blocks of the apparatus of FIG. 13 are shown in FIG. 14 (I) to (VIII), with the scanning time for one horizontal scanning line being represented by 1H.

Figure 13:
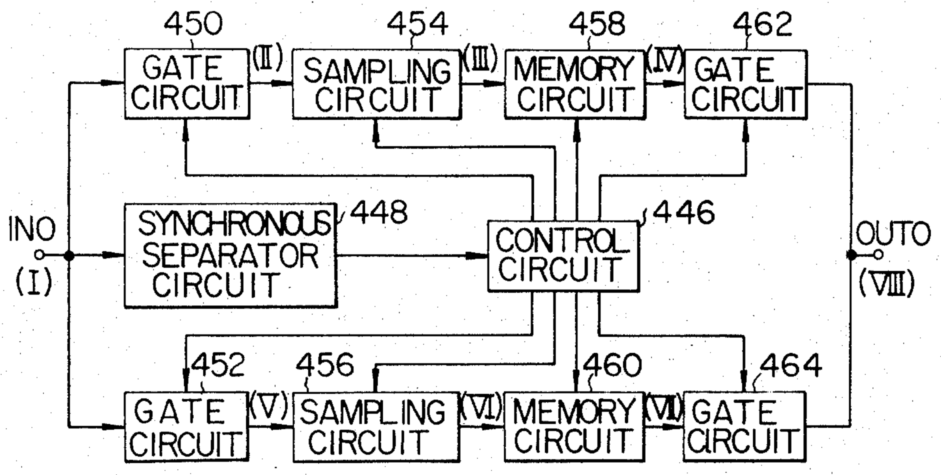
FIG. 13 is a block diagram showing another embodiment of a recording apparatus for use in the recording and reproducing system according to the present invention.
Figure 14:
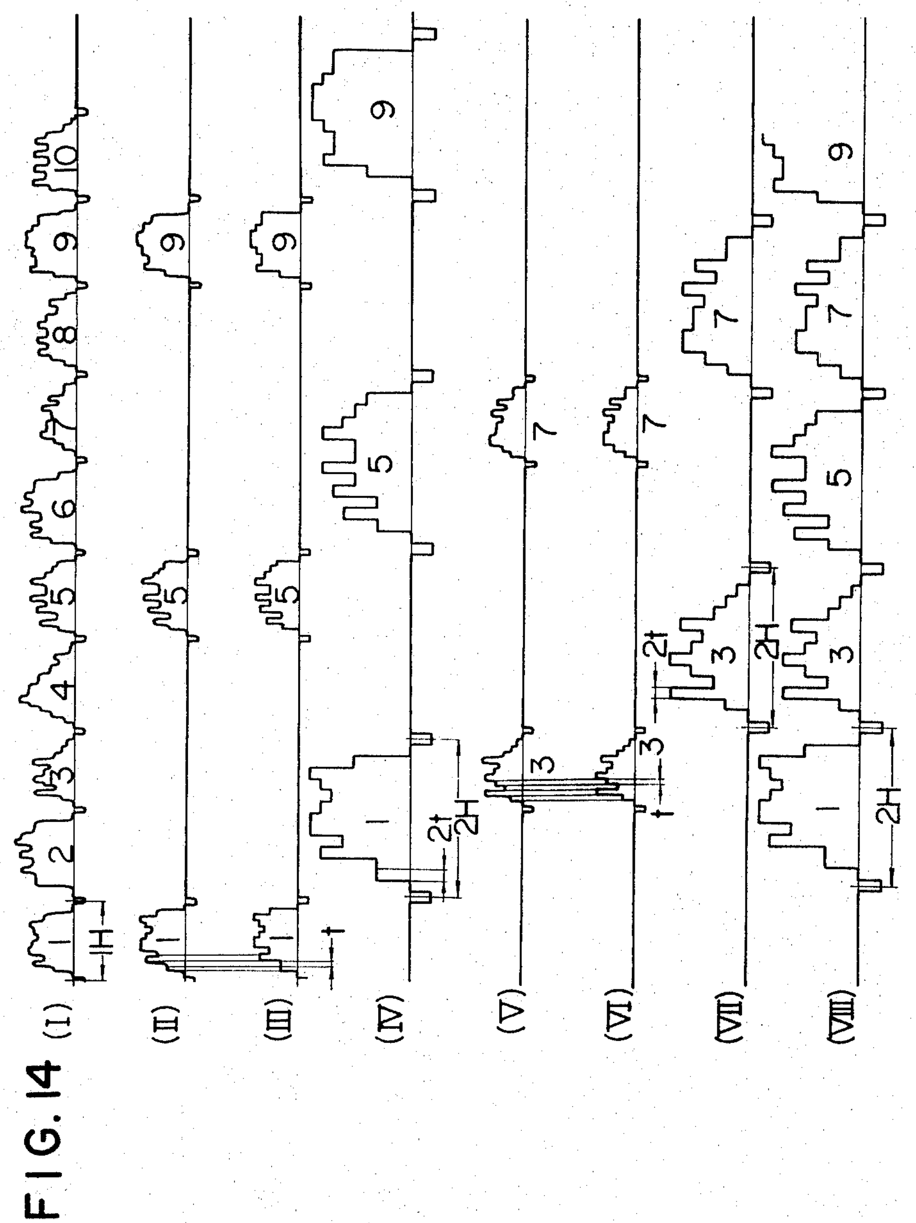
FIG. 14 shows the wave forms of the outputs of certain blocks of the apparatus shown in FIG. 13.

When a video signal of the wave form shown in FIG. 14 (I) is introduced into an input terminal Ino in FIG. 13, a control circuit 446 is actuated by a synchronous separator circuit 448 which separates synchronizing signals to successively control gate circuits 450 and 452, sampling circuits 454 and 456, memory circuits 458 and 460 and gate circuits 462 and 464 which are arranged symmetrically. The video signal (See FIG. 14(I)) introduced into the input terminal Ino of the apparatus of FIG. 13 is converted by gate circuits 450 and 452 into two signals representing one horizontal scanning line taken out from four lines as shown in FIG. 14 (II) and 14 (V). It is seen that the signals shown are offset by two lines.

Gate circuits 450 and 452 are actuated by the control circuit 446 actuated by the horizontal synchronizing signals which are separated from the input signal by synchronous separator circuit 448. The signals passed through gate circuits 450 and 452 are sampled by sampling circuits 454 and 456 in a time *t* before being written in memory circuits 458 and 460. The sampled signals are successively written in memory circuits 458 and 460 in synchronism with a sampling timing indicated by the wave forms shown in FIG. 14 (III) and (VI) under the control of control circuit 446. When write-in of a signal for one frame is finished, read-out thereof is effected.

The read-out is carried out in a time 2*t* which is twice as long as the time *t* for carrying out write-in under the control of control circuit 446. The wave forms of the signals read out are shown in FIG. 14 (IV) and (VII). The signals read out are added together by gate circuits 462 and 464 into a signal of the wave form shown in FIG. 14 (VIII) which is produced at an output terminal Outo to be magnetically recorded on a recording medium. Gate circuits 462 and 464 are actuated at intervals of two horizontal periods for readily adding together the signals of FIG. 14 (IV) and (VII).

Each of the memory circuits 458 and 460 is required to have a capacity for 318 words if the sampling period is set at about 0.2$\mu$S. It is thus possible to transmit information of up to 2 MHz. The memory circuits suiting this condition may comprise a conglomerate of capacitors or other elements capable of directly storing analogue quantities, or may include means to convert analogue quantities into digital quantities and to store the information in digital representation. The latter may comprise a conglomerate of flip-flop circuits of different operational levels. The memory circuits which store information in digital representation should have their output signal converted into analogue representation again. Accordingly, when a conglomerate of flip-flop circuits is used, IC's or LSI's can be utilized advantageously.

Figure 15:
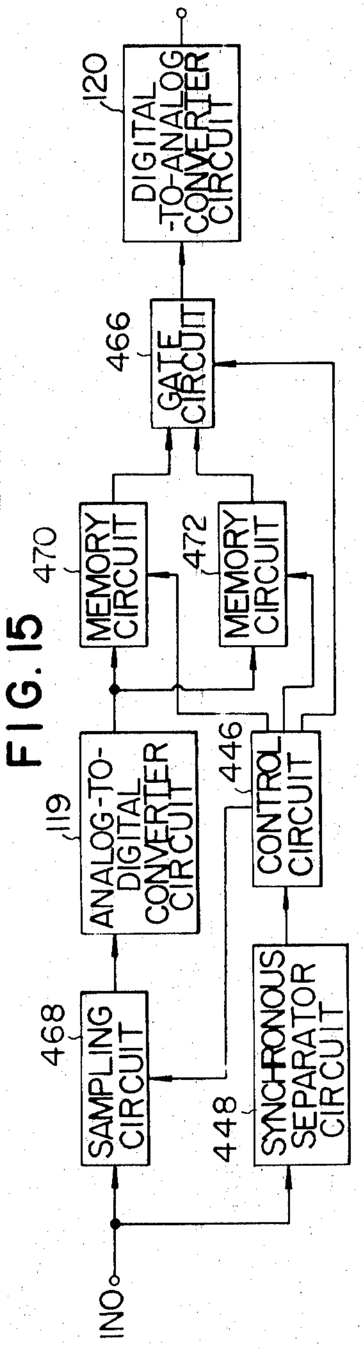
FIG. 15 is a block diagram representing a modification of the apparatus of FIG. 13.

The apparatus shown in FIG. 13 may be replaced by the apparatus shown in FIG. 15. The apparatus shown in FIG. 15 is distinguished from the apparatus shown in FIG. 13 in that gate circuits 450, 452, 462 and 464 are replaced by one gate circuit 466, sampling circuits 454 and 456 are replaced by one sampling circuit 468, the memory circuits used are adapted for write-in and read-out of digital signals, and there are provided an analogue-to-digital converter circuit 119 for converting the output signals of sampling circuit 468 into digital signals to be supplied to the memory circuits 470 and 472 and a digital-to-analogue converter circuit 120 for converting the output signals of gate circuit 466 into analogue signals. Explanations of those parts of the apparatus of FIG. 15 which are similar to the parts described with reference to FIG. 13 is omitted.

Figure 16:
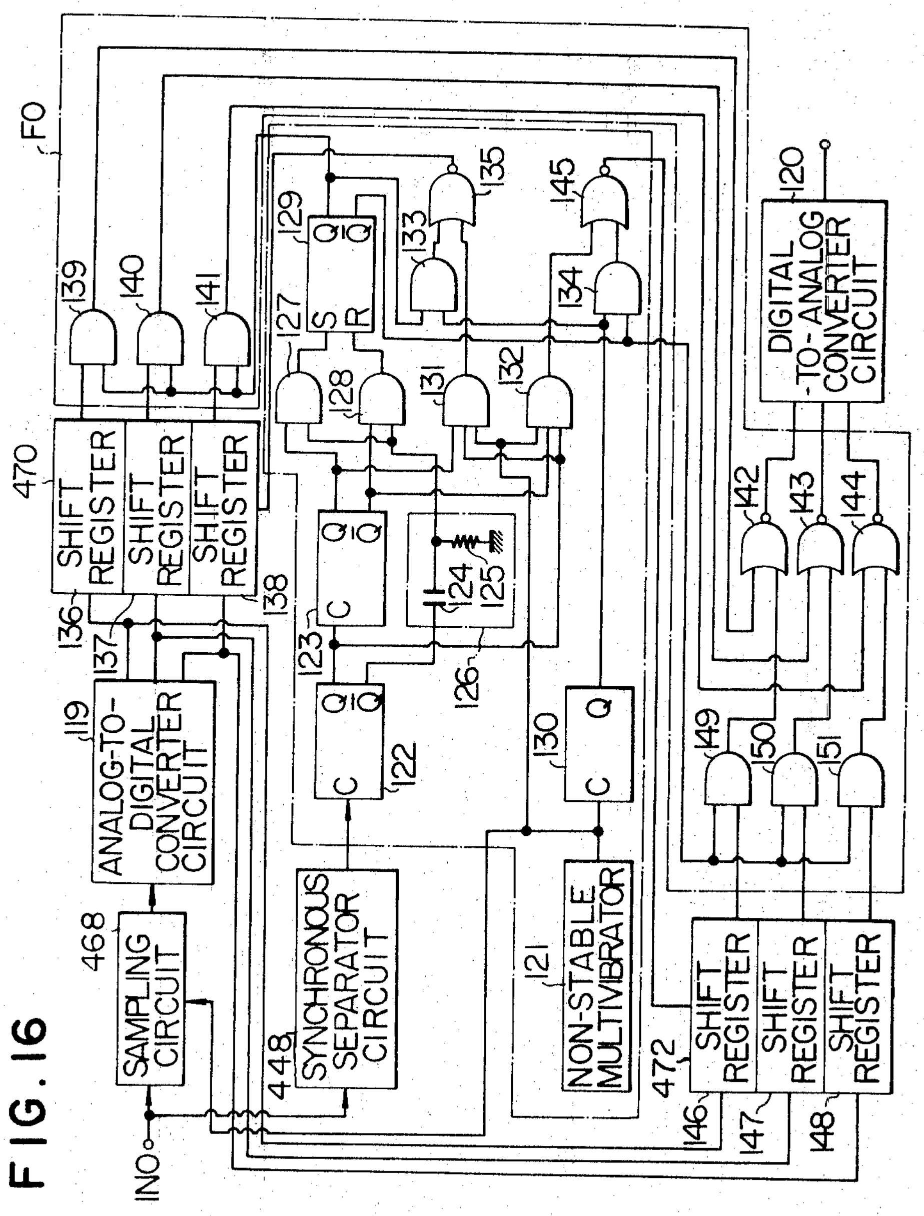
FIG. 16 is a block diagram illustrating in greater detail the apparatus shown in FIG. 15.

The apparatus of FIG. 15 is shown in greater detail in FIG. 16. A video signal of the wave form shown in FIG. 17 (I) introduced into an input terminal INO is passed on to sampling circuit 468 where it is sampled by sampling pulses from a multivibrator 121. The output of sampling circuit 468 is converted into digital signals by analogue-to-digital converter circuit 119, and the resulting digital signals are supplied to memory circuits 470 and 472.

The video signal introduced into input terminal INO in FIG. 16 is also supplied to synchronous separator circuit 448 to have the horizontal synchronizing signals separated therefrom. The horizontal synchronizing signals separated by synchronous separator circuit 448 are supplied to an input terminal *c* of a flip-flop 122 which has its state reversed each time a horizontal synchronizing signal is supplied thereto to produce at a positive output terminal Q thereof a signal of the wave form shown in FIG. 17 (II) and at the same time produce at a reverse output terminal Q' thereof a signal which is opposite in phase to the signal produced at normal output terminal Q.

Figure 17:
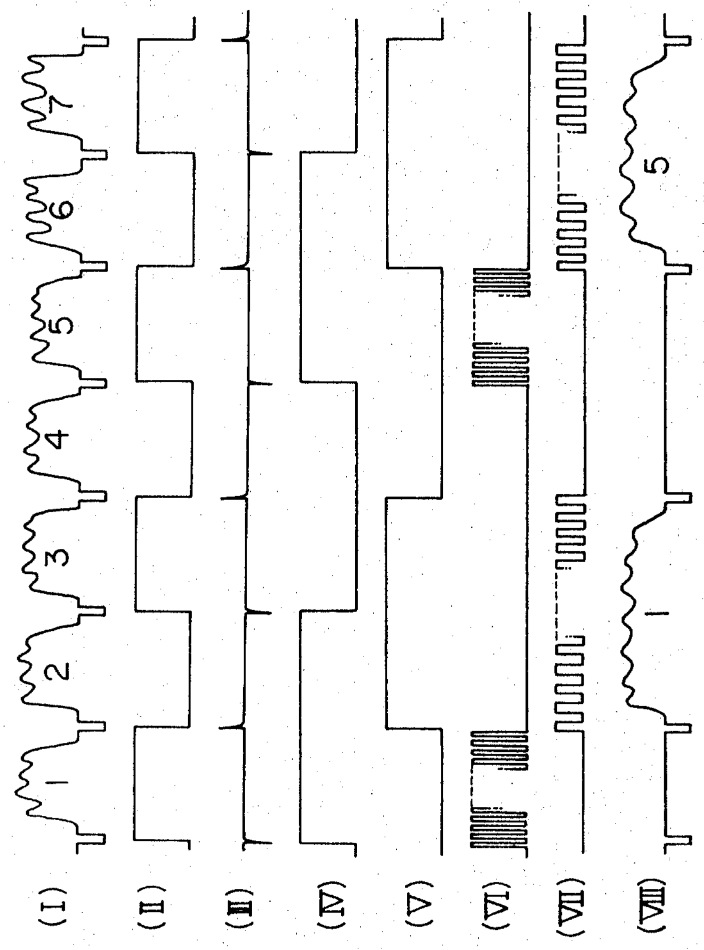
FIG. 17 shows the wave forms of the output signals of certain blocks of the apparatus shown in FIG. 16.

The signal produced at the normal output terminal Q of flip-flop 122 is supplied to an input terminal *c* of a flip-flop 123 which has its state reversed each time a signal is supplied from flip-flop 122 to produce at a normal output terminal Q thereof a signal of the wave form shown in FIG. 17 (IV) and at the same time produce a signal at a reverse output terminal Q' thereof a signal which is opposite in phase to the signal produced at normal output terminal Q.

The signal produced at the reverse output terminal Q' is differentiated by a differentiator circuit 126 comprising a capacitor 124 and a resistor 125 into a signal of the wave form shown in FIG. 17 (III) which is supplied to AND circuits 127 and 128. The signal from the positive output terminal Q of flip-flop 123 is supplied to AND circuit 127 while the signal from the reverse output terminal Q' of flip-flop 123 is supplied to AND circuit 128. The output signal of AND circuit 127 is supplied to a setting input terminal S of a flip-flop 129 which is set thereby while the output signal of AND circuit 128 is supplied to a resetting input terminal R of flip-flop 129 which is reset thereby. Thus, flip-flop 129 has its state reversed at intervals of two horizontal periods to produce at a normal output terminal Q thereof a signal of the wave form shown in FIG. 17 (V) and at a reverse output terminal Q' thereof a signal opposite in phase to the signal produced at its normal output terminal Q.

The output signal of multivibrator 121 is supplied to an input terminal *c* of a flip-flop 130 which produces at an output terminal Q thereof a signal of a frequency which is one-third the frequency of the output signal of multivibrator 121. The signals from multivibrator 121, the normal output terminal Q of flip-flop 122 and the normal output terminal Q of flip-flop 123 are supplied to an AND circuit 131 which produces a signal of the wave form shown in FIG. 17 (VI). Thus, AND circuit 131 repeats an operation in which it is operative to take out the output signal of multivibrator 121 during one horizontal period and remains inoperative for three horizontal periods.

The signals from multivibrator 121, the normal output terminal Q of flip-flop 122 and the reverse output terminal Q' of flip-flop 123 are supplied to an AND circuit 132 which repeats the same operation as AND circuit 131 with a time lag of two horizontal periods. The signals from flip-flop 130 and the normal output terminal Q of flip-flop 129 are supplied to an AND circuit 133 which produces a signal of the wave form shown in FIG. 17 (VII). AND circuit 135 repeats the operation of being: operative to take the output signal of flip-flop 130 during two horizontal periods and inoperative for two horizontal periods.

The signals from flip-flop 130 and the reverse output terminal Q' of flip-flop 129 are supplied to an AND circuit 134 which repeats the same operation as AND circuit 133 with a time lag of two horizontal periods. The output signals of AND circuits 131 and 133 are supplied as shift pulses through a NOR circuit 135 to shift registers 136 to 138 which constitute the memory circuit 470. The bit outputs of analogue-to-digital converter circuit 119 are written in shift registers 136 to 138, shifted, and read out by these shift pulses to be supplied to AND circuits 139 to 141 to which the signal from the normal output terminal Q of flip-flop 129 is also supplied.

Thus, AND circuits 139 to 141 produce signals which have been written in shift registers 136 to 138 by the shift pulses from multivibrator 121 and read out from the shift registers by the shift pulses from AND circuit 130 at a speed one-half that of the write-in speed. These signals are passed through NOR circuits 142 to 144 and supplied to digital-to-analogue converter 120 where they are converted into an analogue signal which has the wave form shown in FIG. 17 (VIII).

The signals from AND circuits 132 and 134 are passed through a NOR circuit 145 and supplied as shift pulses to shift registers 146 to 148 which constitute the memory circuit 472. The bit outputs of analogue-to-digital converter circuit 119 are written in shift registers 146 to 148, shifted, and read out by these shift pulses to be supplied to AND circuits 149 to 151 to which the signal from the reverse output terminal Q' of flip-flop 129 is also supplied.

Thus, AND circuits 149 to 151 produce signals which have been written in shift registers 146 to 148 by shift pulses from multivibrator 121 with a time lag of two horizontal periods as compared with the signals written in shift registers 136 to 138 and read out by the shift pulses from flip-flop 130 at a speed one-half that of the write-in speed. The output signals of AND circuits 149 to 151 are passed through NOR circuits 142 to 144 and supplied to digital-to-analogue converter 120 where they are converted into an analogue signal.

The output signal of digital-to-analogue converter circuit 120 is amplified by an amplifier (not shown) and recorded on a magnetic tape (not shown) by a magnetic head (not shown). The multivibrator 121, flip-flops 122, 123, 129 and 130, differentiator circuit 126, AND circuits 127, 128 and 131 to 134, and NOR circuits 135 and 145 in FIG. 16 constitute the control circuit 446 of FIG. 15. The AND circuits 139 to 141 and 149 to 151 and NOR circuits 142 to 144 of FIG. 16 constitute the gate circuit 466 of FIG. 15.

From the foregoing description, it is seen that in this embodiment the time required for read-out of a video signal is twice as long as that for write-in, so that the video signal frequency is reduced by half. The two memory circuits 470 and 472 produce outputs alternately so that signals produced for every other horizontal scanning lines of the input signal are taken out in a continuous stream.

Figure 18:
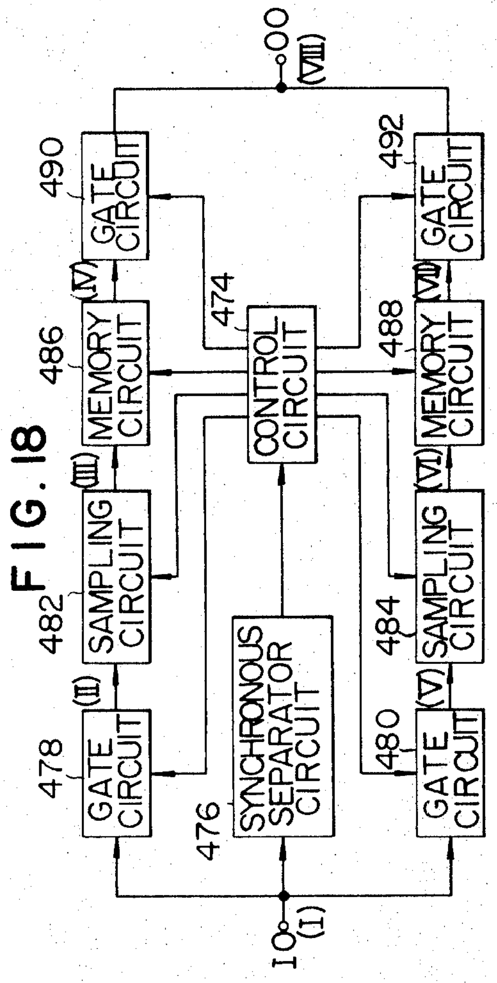
FIG. 18 is a block diagram showing another embodiment of a reproducing apparatus for use in the recording and reproducing system according to this invention to reproduce signals originally recorded by the apparatus shown in FIG. 13.
Figure 19:
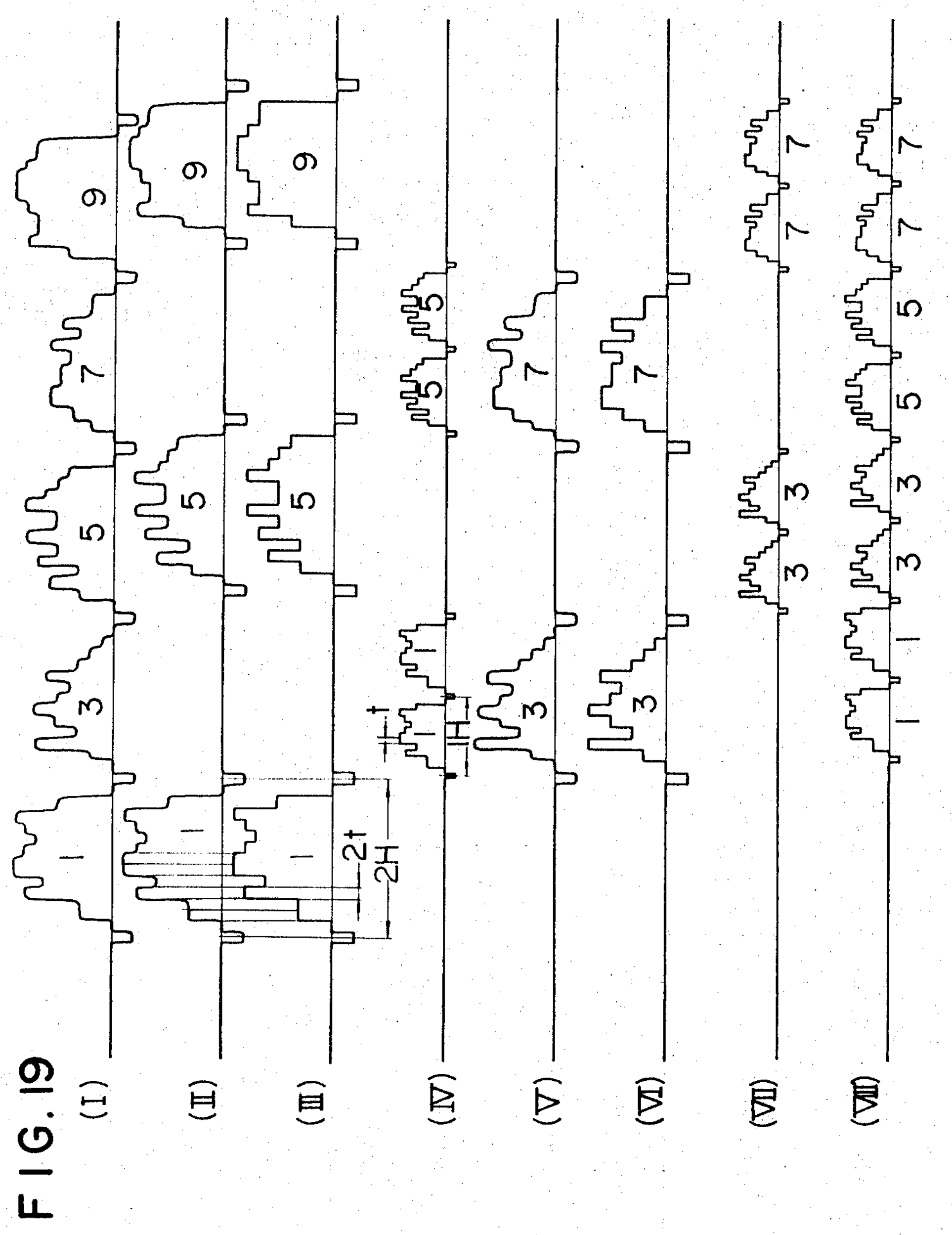
FIG. 19 shows the wave forms of the output signals of certain blocks of the apparatus shown in FIG. 18.

The video signal magnetically recorded on the magnetic tape as aforementioned is reproduced by using apparatus such as that shown in FIG. 18. The wave forms of the output signals of various blocks of the apparatus are as shown in FIG. 19 (I) to (VIII). When a signal of the wave form shown in FIG. 19 (I) is introduced into an input terminal I*o* of FIG. 18, a control circuit 474 is actuated by a synchronous separator circuit 476 which separates the synchronizing signals, thereby successively actuating gate circuits 478 and 480, sampling circuits 482 and 484, memory circuits 486 and 488, and gate circuits 490 and 492 which are arranged symmetrically with respect to the control circuit 474.

When a signal of the wave form shown in FIG. 19 (I) whose one horizontal scanning time is 2H is supplied to the input terminal I*o* of the reproducing apparatus of FIG. 18, the signal is supplied alternately to memory circuits 486 and 488 for each frame by gate circuits 478 and 480 which are controlled by control circuit 474 actuated by the horizontal synchronizing signals separated from the input signal by synchronous separator circuit 476.

The signals passed through gate circuits 478 and 480 are sampled by sampling circuits 482 and 484 in a time 2*t* (See FIG. 19 (III), (VI)) for write-in. Write-in of the signals is effected for one frame in synchronism with the sampling time or 2*t* by the control circuit 474. When write-in is finished, read-out of the signals is effected with a read-out period *t* by the control circuit 474. Since the read-out time is 1H, read-out is repeated twice to produce signals of the wave forms shown in FIG. 19 (IV) and (VII). With the memory circuits 486 and 488 alternately producing output signals, the signals are converted into a single signal having the continuous wave form shown in FIG. 19 (VIII) by the gate circuits 490 and 492 controlled by the control circuit 474.

The output produced at an output terminal O*o* is composed of two identical signals of period 1H arranged continuously. Thus, the output signal has a frequency of up to 2 MHz in contrast to the input signal which has a frequency of up to 1 MHz.

The scanning pattern produced on the screen of a television receiving set by this output signal is shown in FIG. 12. As aforementioned, this pattern has horizontal resolution of about 160 lines and vertical resolution of about 160 lines, which corresponds to the aspect ratio of the television screen.

It is to be understood that the capacity and performance of the memory circuits of the reproducing apparatus may be similar to those of the counterparts for the recording apparatus.

Figure 20:
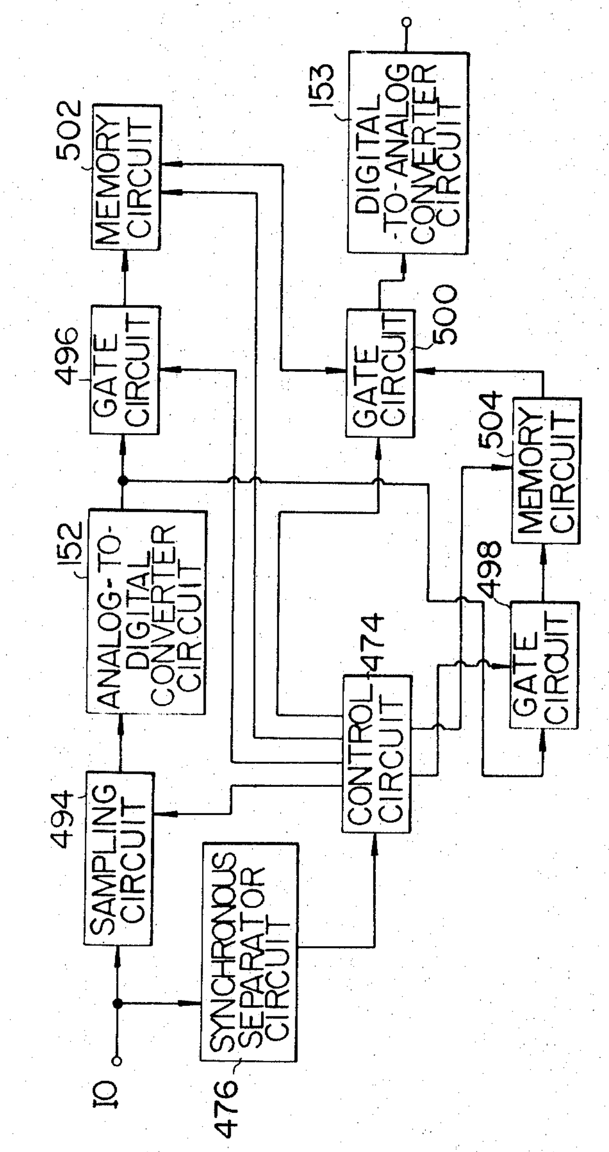
FIG. 20 is a block diagram representing another modification of the apparatus of FIG. 18.

The apparatus shown in FIG. 18 may be replaced by an apparatus shown in FIG. 20. The apparatus shown in FIG. 20 is distinguished from the apparatus shown in FIG. 18 in that sampling circuits 482 and 484 are replaced by one sampling circuit 494, gate circuits 496 and 498 are disposed posterior to the sampling circuit 494, gate circuits 490 and 492 are replaced by one gate circuit 500, the memory circuits 502 and 504 are adapted for write-in and read-out of digital signals, and there are provided an analogue-to-digital converter circuit 152 for converting the output signals of sampling circuit 494 into digital signals to be supplied to gate circuits 496 and 498 and a digital-to-analogue converter circuit 153 for converting the output signals of gate circuit 500 into analogue signals. Explanation of those parts of the apparatus of FIG. 20 which are similar to the parts described with reference to FIG. 18 is omitted.

Figure 21:
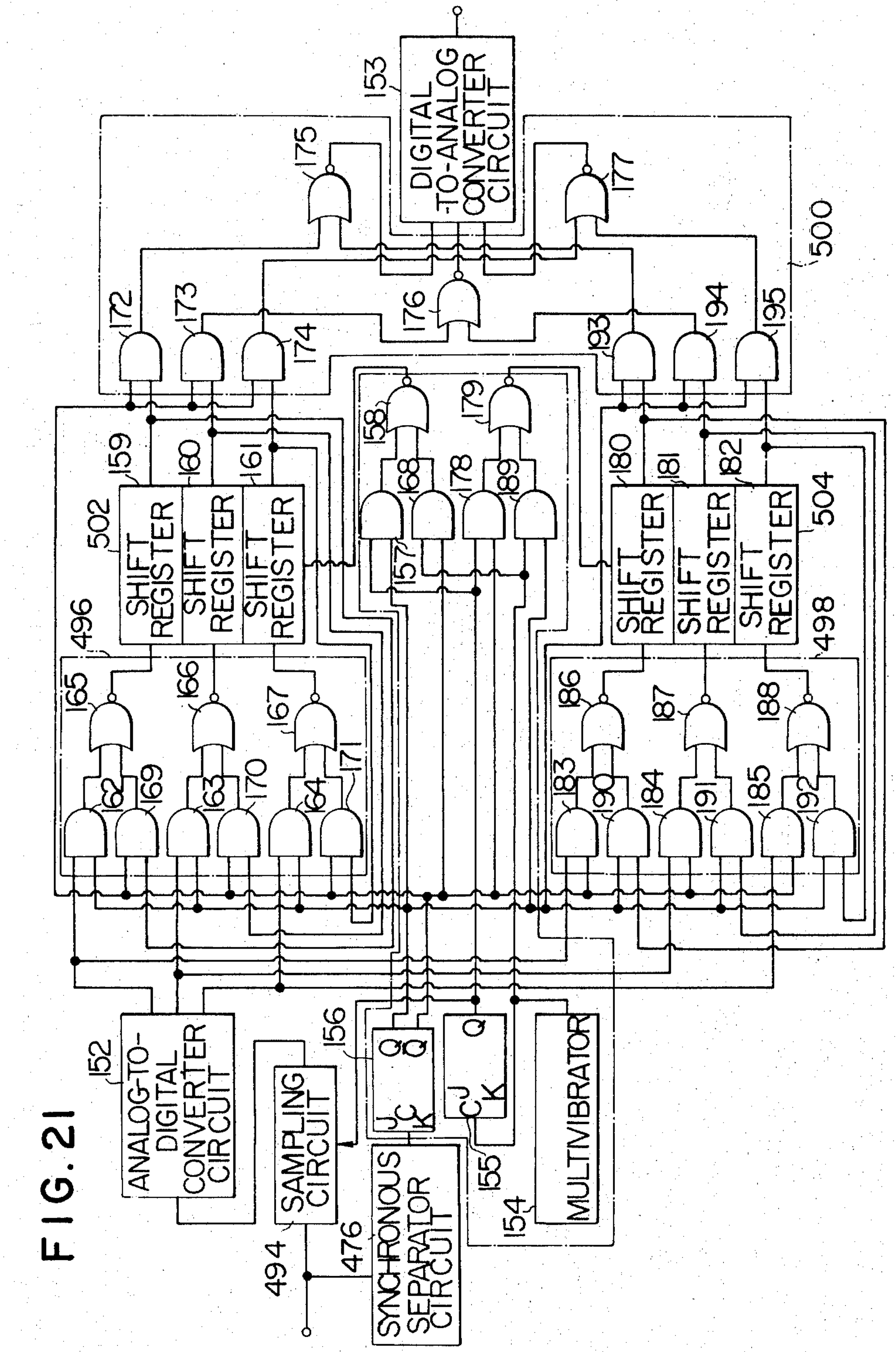
FIG. 21 is a block diagram representing a modification of the apparatus of FIG. 20.

The apparatus of FIG. 20 is illustrated in greater detail in FIG. 21. The signal recorded on magnetic tape by the apparatus shown in FIG. 16 is reproduced by a magnetic head and supplied to an input terminal I*o* after being amplified by an amplifier. The signal introduced into input terminal I*o* has the wave form shown in FIG. 22 (I) and is supplied to sampling circuit 494.

The output signal of a multivibrator 154 is supplied to an input terminal *c* of a flip-flop 155 which produces at an output terminal Q thereof a signal of a frequency which is one-half the frequency of the output signal of multivibrator 154. The output signal of flip-flop 155 is supplied as a sampling pulse to sampling circuit 494 which samples the signal from the input terminal I*o* by this sampling pulse. The output signal of sampling circuit 494 is converted into digital signals by analogue-to-digital converter circuit 152, passed through gate circuits 502 and 504 and supplied to memory circuits 486 and 488.

The signal introduced into the input terminal I*o* is also supplied to synchronous separator circuit 476 where it has horizontal synchronizing signals separated therefrom. The output signal of synchronous separator circuit 476 is supplied to an input terminal *c* of a flip-flop 156 which has its state reversed each time the output signal of synchronous separator circuit 476 is supplied thereto and produces at a normal output terminal Q thereof a signal of the wave form shown in FIG. 22 (II) and at a reverse output terminal Q′ thereof a signal which is opposite in phase to the signal produced at the normal output terminal Q.

Figure 22:
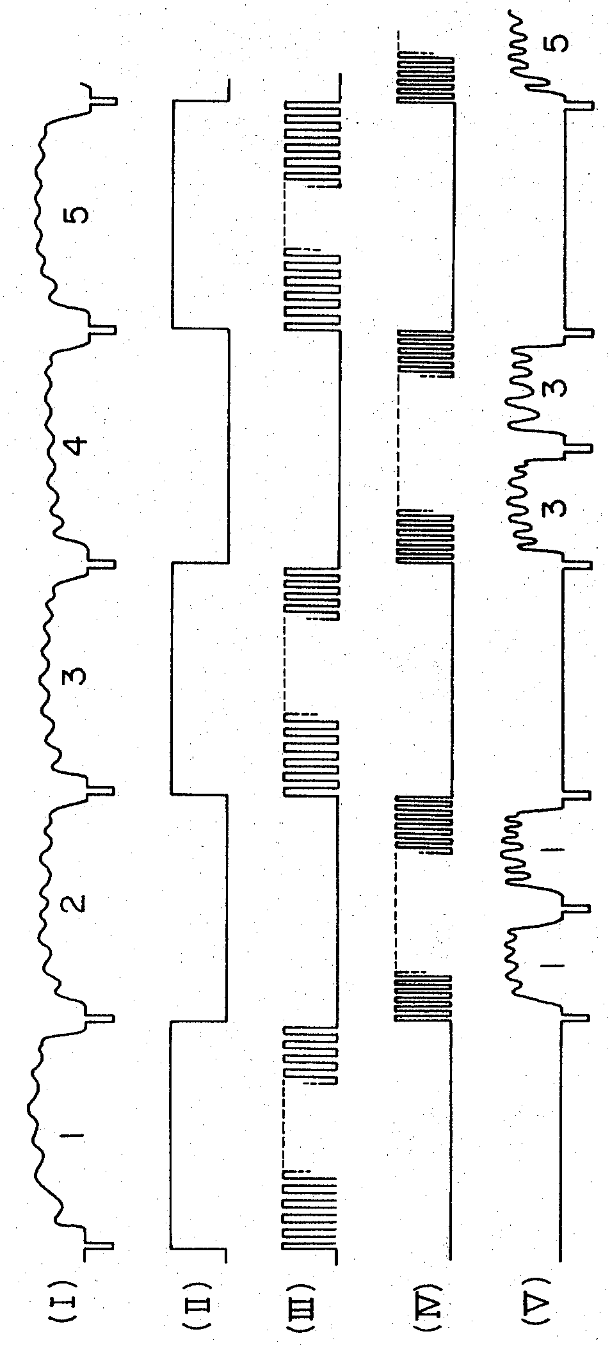
FIG. 22 shows the wave forms of the output signals of certain blocks of the apparatus shown in FIG. 21.

The signals from flip-flop 155 and the normal output terminal Q of flip-flop 156 are supplied to an AND circuit 157 which produces a signal of the wave form shown in FIG. 22 (III). This signal is passed through a NOR circuit 158 and supplied as shift pulses to shift registers 159 to 161 which constitute the memory circuit 502. The signal from the normal output terminal Q of flip-flop 156 is supplied to AND circuits 162 to 164 together with the bit outputs of analogue-to-digital converter circuit 152. The signals from AND circuits 162 to 164 are passed through NOR circuits 165 to 167 and supplied to shift registers 159 to 161 which constitute the memory circuit 502. Thus, during the time the signal from the normal output terminal Q of flip-flop 156 is being produced, the bit outputs of analogue-to-digital converter circuit 152 are written in shift registers 159 to 161 by the shift pulses from flip-flop 155.

The signals from the reverse output terminal Q′ of flip-flop 156 and multivibrator 154 are supplied to an AND circuit 168 which produces an output signal of the wave form shown in FIG. 22 (IV) which output signal is passed through a NOR circuit 158 and supplied as shift pulses to shift registers 159 to 161. Furthermore, the signals from the reverse out-put terminal Q′ of flip-flop 156 is supplied together with the bit outputs of analogue-to-digital converter circuit 152 to AND circuits 169 to 171 whose output signals are passed through NOR circuits 165 to 167 to shift registers 159 to 161. Thus, during the time the signal from the reverse output terminal Q′ of flip-flop 156 is being produced, signals are read out from shift registers 159 to 161 by the shift pulses from multivibrator 154 at a speed twice as high as that of write-in. The read-out signals are supplied to AND circuits 172 to 174 to which the output signal from the reverse output terminal Q′ of flip-flop 156 is supplied, and at the same time written in shift registers 159 to 161 again. As a result, the signals written in shift registers 159 to 161 are read out and taken out twice from AND circuits 172 to 174.

The signals from AND circuits 172 to 174 are passed through NOR circuits 175 to 177 and converted into an analogue signal by digital-to-analogue converter circuit 153 which is taken out as a video signal of the wave form shown in FIG. 22 (V).

The signals from flip-flop 155 and the reverse output terminal Q' of flip-flop 156 are supplied to an AND circuit 178 whose output signal is passed through a NOR circuit 179 and supplied as shift pulses to shift registers 180 to 182 which constitute the memory circuit 504. The signal from the reverse output terminal Q' of flip-flop 156 is supplied together with the bit outputs of analogue-to-digital converter circuit 152 to AND circuits 183 to 195 whose output signals are passed through NOR circuits 186 to 188 and supplied to shift registers 180 to 182. Thus, during the time the signal from the reverse output terminal Q' of flip-flop 156 is being produced, the bit outputs of analogue-to-digital converter circuit 152 are written in shift registers 180 to 192 by the shift pulses from flip-flop 155. The signals from the normal output terminal Q of flip-flop 156 and multivibrator 154 are supplied to an AND circuit 189 whose output signal is passed through a NOR circuit 199 and supplied as shift pulses to shift registers 180 to 182.

The signal from the normal output terminal Q of flip-flop 156 is supplied together with the bit outputs of analogue-to-digital converter circuits 152 to AND circuits 190 to 192 whose output signals are passed through NOR circuits 186 to 188 and supplied to shift registers 180 to 182. Thus, during the time the signal from the normal output terminal Q of flip-flop 156 is being produced, signals are read out from shift registers 180 to 182 by the shift pulses from multivibrator 154 at a speed which is twice as high as that for write-in. The read-out signals are supplied to AND circuits 193 to 195 and at the same time written in shift registers 180 to 182 again.

Shift registers 180 to 182 are reversed in write-in and read-out operations with respect to shift registers 159 to 161. This is, when shift registers 180 to 182 are performing a write-in operation, shift registers 159 to 161 perform a read-out operation and vice versa. The output signal of the normal output terminal Q of flip-flop 156 is supplied to AND circuits 193 to 195. Thus, the signals read out of shift registers 180 to 182 are passed through AND circuits 193 to 195 and NOR circuits 175 to 177 and converted into an analogue signal by digital-to-analogue converter circuit 153.

The multivibrator 154, flip-flops 155 and 156, AND circuits 157, 168, 179 and 189, and NOR circuits 158 and 179 of FIG. 21 constitute the control circuit 474 of FIG. 20. The AND circuits 162 to 164 and 169 to 171, and NOR circuits 165 to 167 of FIG. 21 constitute the gate circuit 496 of FIG. 20. The AND circuits 183 to 185 and 190 to 192 and NOR circuits 186 to 188 of FIG. 21 constitute the gate circuit 498 of FIG. 20. The AND circuits 172 to 174 and 193 to 195 and NOR circuits 175 to 177 of FIG. 21 constitute the gate circuit 500 of FIG. 20.

From the foregoing description, it should be appreciated that the embodiments described above permit a video signal comprising high frequency components to be converted into signals of lower frequency for recording, and then permit such signals to be reconverted into a video signal of the original frequency for playback. The invention permits convenient and relatively inexpensive recording and reproducing of video signals, and provides a recording and reproducing system which does not degrade the information content of data due to lowering of frequency, and in which reduction in resolution is avoided and deterioration in the quality of the image on a television screen is minimized.

What I claim is:

1. A video signal recording and reproducing system comprising means for receiving a video signal, means for dividing the received signal into a plurality of signals by time division, means for writing each of said plurality of signals into a memory circuit, means for reading the signals out of the memory circuits in time periods longer than the write-in time periods, means for magnetically recording the signals read out of the memories, thus reducing the frequency band of the recorded signals to a lower level than the band of the video signal, means for magnetically reproducing the recorded signals, means for successively writing the reproduced signals in a plurality of memory circuits by time division, and means for reading the reproduced signals out of the memory circuits in a time period shorter than the write-in time period thereof, thus restoring the plurality of signals to the original frequency band level, whereby the original video signal is reproduced.

2. A video signal recording and reproducing system comprising means for writing signals each representing one horizontal scanning line for one frame of a video signal successively in a first plurality of memory circuits by time division, means for reading the signals out of the first plurality of memory circuits in time intervals longer than the write-in time intervals to reduce the frequency band of each of the signals to a lower level, means for arranging the read out signals in a plurality of signal trains for separate channels, means for magnetically recording each signal train on an individual track of a magnetic recording medium, means for magnetically reproducing the recorded signals from the respective tracks and successively writing the same in a second plurality of memory circuits by time division, means for reading the signals out of the second plurality of memory circuits in time intervals shorter than the write-in time intervals to restore the signals to the original frequency level, and means for combining the signals to restore the signals to a continuous train of signals, thereby forming the original video signal.

3. A video signal recording and reproducing system comprising means for obtaining the video signal for every other horizontal scanning period, means for dividing the obtained signal into a plurality of signals by time division, means for alternately writing the plurality of signals in two memory circuits for each horizontal scanning period, means for reading the signals out of the memory circuits in time periods which are twice as long as the write-in time intervals to increase the time for one horizontal scanning period to the time corresponding to two horizontal scanning periods, means for arranging the signals stored at every other horizontal scanning period as a continuous signal of one half period for magnetic recording, means for magnetically reproducing the recorded signals, means for successively writing the reproduced signals in two memory circuits by time division, wherein the last mentioned signals each represent a horizontal scanning line, means for reading out the last mentioned signals in a time interval which is one half as long as the write-in time interval to reduce the horizontal scanning time by half, and means for cycling the last mentioned means twice to restore the signals to the original period.

4. A system as in claim 1 wherein the video signal comprises a plurality of first signals each representing one horizontal scan line for one video frame, the means for dividing the video signal into a plurality of signals comprises means for dividing the video signal into a plurality of said first signals, and the means for writing each of said plurality of signals into a memory circuit comprises means for writing each of said plurality of first signals into a separate memory circuit.

5. A system as in claim 4 wherein the means for magnetically recording the signal read out of the memories comprises a magnetic tape and means for recording the signals on said tape.

6. A system as in claim 5 wherein the means for recording the signals read out of the memory comprises a plurality of stationary magnetic recording heads.

7. A system as in claim 1 wherein the means for dividing the received signal into a plurality of signals by time division comprises dividing the video signal into a repeating plurality of successive time intervals and the means for writing each of said plurality of signals into a memory circuit comprises means for writing the portion of the video signal for each of said plurality of time intervals into a separate memory circuit.

8. A system as in claim 7 wherein each of said time intervals defines one scan line of a video image frame.

* * * * *